US012647675B2

(12) United States Patent
Meitl et al.

(10) Patent No.: US 12,647,675 B2
(45) Date of Patent: Jun. 2, 2026

(54) VARIABLE-RESOLUTION CAMERAS AND OPTICAL COMMUNICATION SYSTEMS COMPRISING VARIABLE-RESOLUTION CAMERAS

(71) Applicant: Daktronics, Inc., Brookings, SD (US)

(72) Inventors: Matthew Alexander Meitl, Durham, NC (US); Ronald S. Cok, Rochester, NY (US); Nikhil Jain, Raleigh, NC (US); Imre Knausz, Fairport, NY (US)

(73) Assignee: Daktronics, Inc., Brookings, SD (US)

( * ) Notice: Subject to any disclaimer, the term of this patent is extended or adjusted under 35 U.S.C. 154(b) by 0 days.

(21) Appl. No.: 18/809,533

(22) Filed: Aug. 20, 2024

(65) Prior Publication Data

US 2025/0310638 A1      Oct. 2, 2025

Related U.S. Application Data

(60) Provisional application No. 63/570,471, filed on Mar. 27, 2024.

(51) Int. Cl.
*H04N 23/66* (2023.01)
*H04N 5/76* (2006.01)
*H04N 7/22* (2006.01)

(52) U.S. Cl.
CPC .............. *H04N 23/66* (2023.01); *H04N 5/76* (2013.01); *H04N 7/22* (2013.01)

(58) Field of Classification Search
CPC ............. H04N 23/66; H04N 5/76; H04N 7/22
USPC ....................................... 348/211.1
See application file for complete search history.

(56) References Cited

U.S. PATENT DOCUMENTS

| | | | |
|---|---|---|---|
| 6,798,396 B2 | 9/2004 | Gemunder et al. | |
| 7,411,609 B2 | 8/2008 | Brumitt et al. | |
| 9,832,441 B2 * | 11/2017 | Osman ................ | G07F 17/3216 |
| 11,568,796 B1 | 1/2023 | Ozbas et al. | |
| 12,236,825 B2 | 2/2025 | Cok et al. | |
| 12,300,150 B2 | 5/2025 | Jain et al. | |
| 2006/0038833 A1 * | 2/2006 | Mallinson ............. | G06F 1/1686 |
| | | | 345/633 |
| 2010/0053164 A1 * | 3/2010 | Imai ........................ | G06F 3/147 |
| | | | 345/1.3 |
| 2012/0013770 A1 * | 1/2012 | Stafford ........... | H04N 21/44008 |
| | | | 348/239 |
| 2012/0086630 A1 * | 4/2012 | Zhu ........................ | A63F 13/26 |
| | | | 345/156 |
| 2012/0287287 A1 * | 11/2012 | Grossmann .......... | H04N 17/002 |
| | | | 348/181 |
| 2017/0064282 A1 * | 3/2017 | Lo ........................ | H04N 23/667 |
| 2020/0175916 A1 | 6/2020 | Zou et al. | |
| 2020/0286410 A1 | 9/2020 | Wu | |
| 2021/0111302 A1 | 4/2021 | Pan | |

(Continued)

*Primary Examiner* — Usman A Khan
(74) *Attorney, Agent, or Firm* — Schwegman Lundberg & Woessner, P.A.

(57) ABSTRACT

A variable-resolution optical communication system includes a display operable to display an image and a variable-resolution camera disposed and operable to optically capture the image displayed on the variable-resolution display. A variable-resolution camera includes a camera substrate and camera pixels disposed on the camera substrate. The camera pixels have a variable spatial resolution, for example a variable camera pixel spacing, over the camera substrate and are controllable to capture light.

14 Claims, 10 Drawing Sheets

(56)  References Cited

U.S. PATENT DOCUMENTS

| 2021/0335187 | A1 | 10/2021 | Hong et al. | |
| 2022/0208142 | A1* | 6/2022 | Yang | ...................... H04N 23/74 |
| 2023/0196979 | A1 | 6/2023 | Cok | |
| 2025/0080823 | A1 | 3/2025 | Cok et al. | |
| 2025/0166554 | A1 | 5/2025 | Cok | |

* cited by examiner

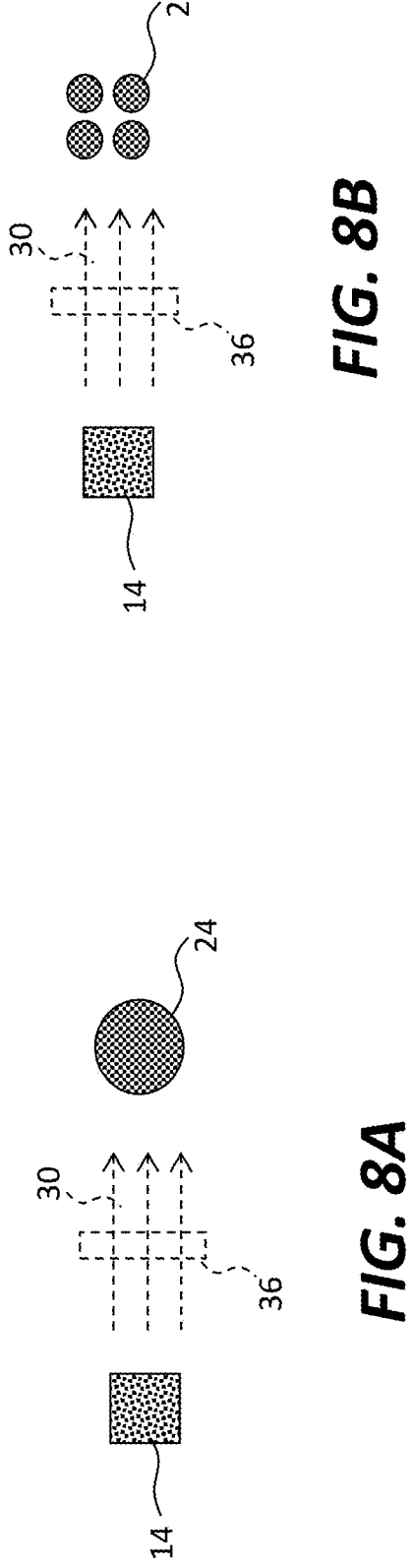
FIG. 8A
FIG. 8B
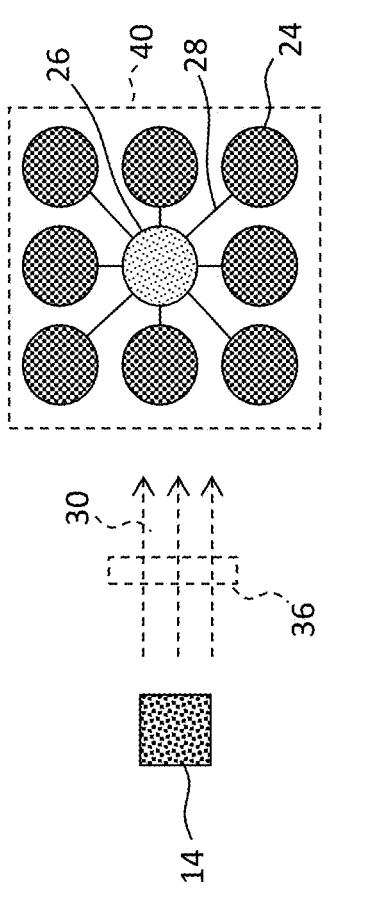
FIG. 8C

VARIABLE-RESOLUTION CAMERAS AND OPTICAL COMMUNICATION SYSTEMS COMPRISING VARIABLE-RESOLUTION CAMERAS

PRIORITY APPLICATION

This application claims the benefit of U.S. Provisional Patent Application No. 63/570,471, filed on Mar. 27, 2024, the disclosure of which is hereby incorporated by reference herein in its entirety.

CROSS REFERENCE TO RELATED APPLICATION

Reference is made to U.S. Patent Application No. 63/579,809 filed Aug. 30, 2023 entitled Optical Communication Systems with Displays by Cok et al. and to 63/602,079 filed Nov. 22, 2023 entitled Variable-Resolution Displays by Cok et al., the disclosures of which are incorporated by reference herein in their entirety.

TECHNICAL FIELD

The present disclosure relates generally to devices and methods for optical communication using a display and a camera.

BACKGROUND

Optical systems are widely used to communicate between remote locations. Typical optical communication systems transmit optical signals from a laser to a photosensor through fiber optic cables. Some cables transmit a single signal through a single-mode fiber, other cables transmit multiple signals through a multi-mode fiber. Free-space optical systems transmit optical signals through free space (e.g., the atmosphere or outer space) with modulated laser light detected by a photosensor positioned within an optical path of the laser beam.

There is an increasing need for communication bandwidth and computation to support such applications as artificial intelligence, internet search fulfilment, and internet services requiring internet-accessible computers. To support this need, a large number of computers must compute and communicate and are often co-located in data centers. Conventionally, the computers in a data center communicate electronically, for example through wired ethernet connections. More recently, fiber optic cables optically connect computers within a single data center. However, the physical size of the fiber optic cables, the length of the fiber optic cables, and the connections between the fiber optic elements and electronic equipment are becoming limitations on the computational capacity of connected computers within a data center.

There is a need, therefore, for improvements in devices and methods for optical communication.

SUMMARY

The present disclosure provides, inter alia, architectures, structures, systems, devices, and methods for improved optical communication using camera pixels in a variable-resolution camera and system. In embodiments, a variable-resolution optical communication system can comprise a display (e.g., a variable-resolution display) operable to display (show) an image and a variable-resolution camera (e.g., a digital camera) disposed and operable to optically capture (e.g., record) the image displayed on the variable-resolution display. The variable-resolution camera can optically receive, absorb, record, or capture images from the display. In embodiments, an image or image data shown with display pixels of the display can be imaged by an optical system (e.g., comprising lenses or mirrors, or both) onto camera pixels of the variable-resolution camera. The variable-resolution optical communication system can comprise a processor (e.g., a computer or CPU) connected to the variable-resolution camera or the variable-resolution camera can comprise a processor, computer, or CPU operable to process the recorded image. The variable-resolution optical communication system can comprise a memory (e.g., a digital memory) connected to the variable-resolution camera or processor or the variable-resolution camera can comprise a memory operable to store the recorded image. The variable-resolution camera can capture an image shown on the display and record the captured image in the memory. The recorded image can be accessed and processed by the processor, CPU, or computer. In some embodiments, the memory is operable to store a digital map of the pixel locations on the display substrate and the processor can access the memory and use the stored digital map to process the captured, recorded, and stored image.

In some embodiments, the variable-resolution camera comprises a camera substrate and camera pixels disposed on the camera substrate. The camera pixels can have a variable spatial resolution (e.g., a variable camera pixel spacing) over the camera substrate in a camera image capture area and are controllable to capture light. Thus, in embodiments, two adjacent camera pixels can be separated by a first distance in a direction and two other adjacent camera pixels can be separated by a second distance different from the first distance in the same direction. The camera pixels can be disposed in two orthogonal directions over the camera substrate.

In some embodiments, the display is a display having a fixed resolution in which the display pixels are all separated by a common distance in each dimension. In some embodiments, the display is a variable-resolution display that comprises a display substrate and display pixels disposed on the camera substrate in a display area. The display pixels can have a variable spatial resolution (e.g., a variable display pixel spacing) over the display substrate and are controllable to emit light. Thus, in embodiments, two adjacent display pixels can be separated by a first distance in a direction and two other adjacent display pixels can be separated by a second distance different from the first distance in the direction. The display pixels can be disposed in two orthogonal directions over the display substrate.

In embodiments, camera or display pixel resolution or spacing can vary in one dimension or in two dimensions so that, for example, two adjacent first camera or display pixels are separated by a first distance in a first direction and two other adjacent first pixels are separated by a second distance different from the first distance in the first direction and two adjacent second display or camera pixels are separated by a third distance in a second direction orthogonal to the first direction and two other adjacent second display or camera pixels are separated by a fourth distance different from the third distance in the second direction.

In some embodiments of the present disclosure, the variable spatial resolution of the display pixels is spatially matched to the variable spatial resolution of the camera pixels. In embodiments, the variable spatial resolution of the display pixels is geometrically similar to the variable spatial resolution of the camera pixels. In embodiments, the display pixels on the display substrate are disposed in the same order, relative location, or arrangement in one dimension or in two dimensions as the camera pixels on the camera substrate, even if the camera pixels have a different size from the display pixels.

In embodiments of the present disclosure, the display can be disposed relative to the variable-resolution camera such that at least one of the display pixels is optically imaged to at least one of the camera pixels. In some embodiments, the display is disposed relative to the variable-resolution camera such that at least one of the display pixels is optically imaged to at least one group of multiple, adjacent camera pixels. In some embodiments, the multiple, adjacent camera pixels form a two-dimensional array.

In some embodiments of the present disclosure, one or more display pixel clusters can comprise a display cluster controller disposed on the display substrate between ones of the display pixels and two or more display pixels. The display cluster controller can be operable to control two or more display pixels in the display pixel cluster. In some embodiments, one or more camera pixel clusters can comprise a camera cluster controller disposed on the camera substrate between ones of the camera pixels and two or more camera pixels. The camera cluster controller can be operable to control two or more camera pixels in the camera pixel cluster. The spacing between adjacent camera pixels within the camera pixel cluster can be the same in one dimension or in two dimensions or can be different in one dimension or in two dimensions. Some embodiments comprise multiple camera pixel clusters and a spacing between at least some adjacent camera pixels within a camera pixel cluster can be different from a spacing of adjacent camera pixels in different adjacent camera pixel clusters in one dimension or in two dimensions. In embodiments, the display is disposed relative to the variable-resolution camera such that a display pixel cluster is optically imaged onto a camera pixel cluster. In embodiments, a display pixel cluster is geometrically similar to a camera pixel cluster.

Some embodiments comprise a camera circuit disposed on the camera substrate that is electrically connected and operable to control or receive signals from one, two, or three or more camera pixels. Similarly, some embodiments comprise a display circuit disposed on the display substrate that is electrically connected and operable to control one, two, or three or more display pixels to emit light. In embodiments, the display or camera circuits can be thin-film circuits formed in or on and native to the display substrate or camera substrate, respectively, the display or camera substrate can be a semiconductor substrate, the display or camera circuits can be formed in or on and native to one or more layers of the display substrate, or the display or camera circuits can be non-native circuits having a circuit substrate separate and independent from and non-native to the display or camera substrate formed in a separate source wafer and transferred to the display or camera substrate, for example using micro-transfer printing, and can comprise broken (e.g., fractured) or separated tethers.

In some embodiments, a camera circuit or a display circuit (or circuit wiring) can be disposed on a camera or display substrate between camera or display pixels on the camera or display substrate, for example at or near a center of the camera or display substrate or at an edge of the camera or display substrate. In some embodiments, fewer camera pixels per unit area of the camera substrate are disposed closer to a center of the camera substrate than to an edge of the camera substrate. In some embodiments, fewer camera pixels per unit area of the camera substrate can be disposed in a cluster of pixels than at an edge of the camera substrate. In some embodiments, more camera pixels per unit area of the camera substrate can be disposed in a cluster of pixels or closer to a center of the camera substrate than at an edge of the camera substrate. In some embodiments, fewer camera pixels per unit area of the camera substrate can be disposed at a center of a cluster of pixels than at an edge of the cluster of pixels or between clusters of pixels. In some embodiments, more camera pixels per unit area of the camera substrate can be disposed at a center of a cluster of pixels than at an edge of the cluster of pixels or between clusters of pixels. Similarly, in some embodiments, fewer display pixels per unit area of the display substrate are disposed closer to a center of the display substrate than at an edge of the display substrate. In some embodiments, fewer display pixels per unit area of the display substrate are disposed in a cluster of pixels than at an edge of the display substrate. In some embodiments, more display pixels per unit area of the display substrate are disposed in a cluster of pixels or closer to a center of the display substrate than at an edge of the display substrate. In some embodiments, fewer display pixels per unit area of the display substrate can be disposed at a center of a cluster of pixels than at an edge of the cluster of pixels or between clusters of pixels. In some embodiments, more display pixels per unit area of the display substrate can be disposed at a center of a cluster of pixels than at an edge of the cluster of pixels or between clusters of pixels.

In some embodiments, a camera circuit for controlling one or more camera pixels on the camera substrate is disposed between the camera pixels and in or on a portion of the camera substrate having a lower camera-pixel resolution than another area of the camera substrate. The camera substrate can have edges (e.g., two or more edges or can have a rectangular shape with four edges) and fewer camera pixels per unit area of the camera substrate can be disposed at one of the edges than at another of the edges. In some embodiments, a wire extends from an edge of the camera substrate to the camera circuit and is electrically connected to the camera circuit. Some embodiments comprise a plurality of camera circuits that each is exclusively electrically connected to and controls an exclusive subset of the camera pixels. In some embodiments, the edge of the camera substrate has fewer camera pixels per unit area of the camera substrate than another edge. In some embodiments, the camera circuit can be disposed between adjacent camera pixels in a pixel cluster in one dimension or in two dimensions. In some embodiments, the camera circuit can be disposed between adjacent camera pixels in different pixel clusters in one dimension or in two dimensions.

Similarly, in some embodiments, a display circuit for controlling one or more display pixels on the display substrate is disposed between the display pixels and in or on a portion of the display substrate having a lower resolution than another area of the display substrate. The display substrate can have edges (e.g., two or more edges or can have a rectangular shape with four edges) and fewer display pixels per unit area of the display substrate can be disposed at one of the edges than at another of the edges. In some embodiments, a wire extends from an edge of the display substrate to the display circuit and is electrically connected to the display circuit. Some embodiments comprise a plurality of display circuits that each is exclusively electrically connected to and controls an exclusive subset of the display pixels. In some embodiments, the edge of the display substrate has fewer display pixels per unit area of the display substrate than another edge. In some embodiments, the display circuit can be disposed between adjacent display pixels in a pixel cluster in one dimension or in two dimensions. In some embodiments, the display circuit can be disposed between adjacent display pixels in different pixel clusters in one dimension or in two dimensions.

In embodiments of the present disclosure, the camera or display pixels are monochrome pixels that absorb (receive) or emit the same color of light. In some such embodiments, the spatial resolution is defined by the distance in a direction between two adjacent pixels that absorb or emit the monochrome light or the pitch of two adjacent pixels that absorb or emit the monochrome light.

In some embodiments, the camera or display pixels are color pixels comprising subpixels that each emit a different color of light. In some embodiments, the spatial resolution is defined by the distance between two adjacent subpixels that absorb or emit the same color of light or the pitch of two adjacent subpixels that absorb or emit the same color of light.

The pitch can be the distance between the centers of two adjacent pixels or subpixels.

According to embodiments of the present disclosure, a method of operating a variable-resolution optical communication system can comprise displaying an image with the display pixels in the display (e.g., of a variable-resolution display), exposing light from the display onto the camera pixels of the variable-resolution camera, for example using an optical system, capturing the image with the camera pixels in the variable-resolution camera, recording the image, e.g., in a memory internal or external to the variable-resolution camera, and processing the recorded image. In some embodiments, the recorded image is processed to extract a value from each of the display pixels. In some embodiments, the recorded image is compared to the digital map with the processor to locate the pixels in the recorded image and extract a value from each of the located pixels. In some embodiments, the display pixels (or pixel values) displayed are binary values and the camera pixels captured, recorded, or processed are binary values.

Some embodiments of the present disclosure comprise capturing or recording all of the camera pixels at a first time or during a first time period before capturing or recording one or more of the camera pixels at a second time after the first time or during a second period after the first period. Some embodiments comprise capturing or recording all of the camera pixels at a same time. Some embodiments comprise sequentially capturing or recording rows of the camera pixels or sequentially capturing or recording columns of the camera pixels.

According to some embodiments of the present disclosure a method of operating an optical communication system comprising a display and a camera (e.g., a variable-resolution camera) comprises simultaneously updating information being displayed by at least one portion of the display while capturing and recording light received from at least one other portion of the display with a camera. In some embodiments, the at least one portion is one or more rows of display pixels and the at least one other portion is a different one or more rows of display pixels. The one or more rows can be one row and the different one or more rows can be one different row.

Some embodiments comprise sequentially updating information being displayed by rows of display pixels and capturing and recording light received from rows of display pixels, wherein no row of display pixels is simultaneously updated and captured and recorded. The at least one portion can be a cluster of display pixels and the at least one other portion can be a different cluster of display pixels. The one or more clusters can be one cluster and the different one or more clusters can be one different cluster.

Some embodiments comprise sequentially updating information being displayed by clusters of display pixels and capturing and recording light received from clusters of display pixels, wherein no clusters of display pixels is simultaneously updated and captured and recorded.

The camera can be a variable-resolution camera. The display can be a variable-resolution display.

Embodiments of the present disclosure provide improvements in devices and methods for optical communication using a display and digital camera.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIGS. 8A-8C are schematic diagrams of a display pixel optically exposed onto a camera pixel, onto multiple camera pixels, or onto a camera pixel cluster, respectively, in a variable-resolution optical communication system according to illustrative embodiments of the present disclosure;

Figure 1:
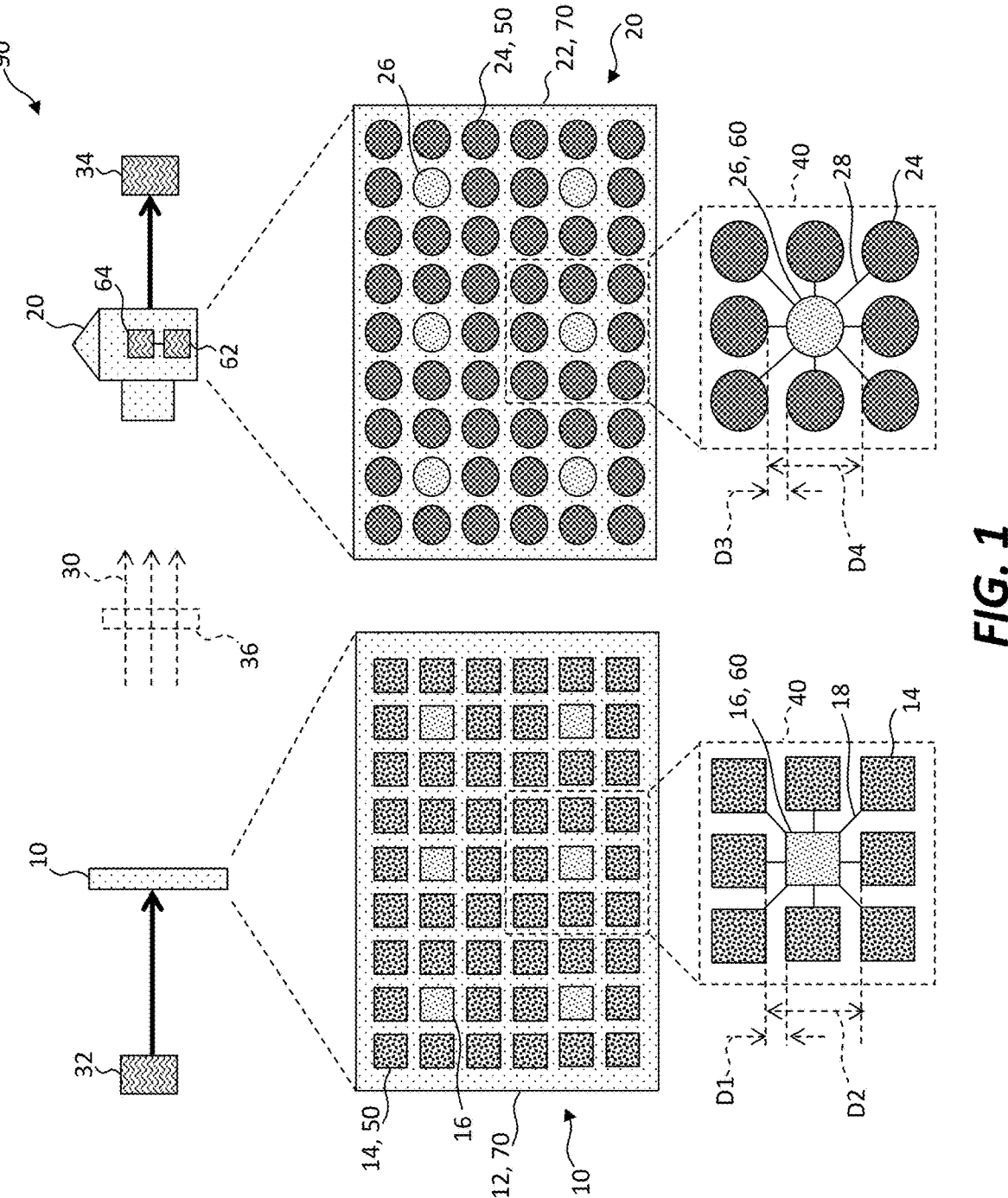
FIG. 1 is a schematic diagram with inset enlargements of an optical communication system according to illustrative embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not necessarily drawn to scale.

DETAILED DESCRIPTION OF CERTAIN EMBODIMENTS

Free-space optical communication systems can suffer from limited bandwidth because of a corresponding limitation in the number of communication channels and the data rate of each communication channel. Embodiments of the present disclosure provide, among other things, free-space communication systems with multiple channels providing increased bandwidth. For example, each pixel in a display (e.g., a variable-resolution display) can provide a free-space optical communication channel detected by a variable-resolution digital camera. If each pixel is a monochrome pixel emitting a single color of light, each pixel can be a separate and individual free-space optical communication channel detected by a variable-resolution digital camera. If each pixel is a color pixel having multiple subpixels emitting different colors of light, each color subpixel can provide a separate and individual free-space optical communication channel detected by a digital camera.

According to some embodiments of the present disclosure and as shown in FIG. 1, a variable-resolution optical communication system 90 can comprise a display 10, for example a variable-resolution display 10, operable to display an input image 32 and a variable-resolution camera 20 disposed and operable to optically capture light 30 from input image 32 displayed on variable-resolution display 10 through an optical system 36 to make a captured image 34. (Display 10 is referred to herein as a variable-resolution display 10 but, in some embodiments, is a fixed-resolution display 10.) Variable-resolution display 10 can be at a first location and variable-resolution camera 20 can be at a second location different from the first location so that information included in the image can be communicated, for example through free space, from the first location to the second location. A first computer or telecommunication system can be electrically or optically connected to variable-resolution display 10 and a second computer or telecommunication system can be electrically or optically connected to variable-resolution camera 20 to communicate information from the first computer or telecommunication system to the second computer or telecommunication system. Information can be encoded in the image by the first computer or telecommunication system and the information can be decoded from the image by the second computer or telecommunication system.

Display 10 can comprise a display substrate 12 and display pixels 14 disposed on display substrate 12, for example with a fixed and constant display-pixel resolution or with a variable display-pixel resolution, in a display area of display substrate 12 that includes all of display pixels 14. In embodiments of the present disclosure, display pixels 14 can have a variable spatial resolution (e.g., a variable display-pixel spacing) over display substrate 12. Display pixels 14 can be controllable to emit light. A variable-resolution display 10 having a variable spatial resolution means that adjacent display pixels 14 on display substrate 12 can be separated by different spatial distances. For example, a first display pixel 14 adjacent to a second display pixel 14 can be separated by a first distance D1 in a direction (or dimension, shown in the left column of display pixels 14 in the variable-resolution display 10 inset) and a third display pixel 14 can be separated from a fourth display pixel 14 by a second distance D2 different from the first distance in the same direction (shown in the center column of display pixels 14 on opposite sides of display cluster controllers 16 in the variable-resolution display 10 inset). Adjacent display pixels 14 are display pixels 14 between which no other display pixel 14 on display substrate 12 is present in a direction or dimension, for example orthogonal directions corresponding to rows and columns of display pixels 14 in horizontal and vertical directions over display substrate 12.

Display pixel 14 can comprise a light-emitter, for example an inorganic micro-light-emitting diode (iLED) that emits light 30 in response to electrical current provided at a suitable voltage. A distance between adjacent display pixels 14 can be a distance between the iLED in each of the adjacent display pixels 14 from an edge or center of the iLED. In some embodiments, display pixel 14 can comprise multiple light emitters, for example multiple inorganic micro-light-emitting diodes (iLED) that each emit light 30 of a different color in response to electrical current provided at a suitable voltage. In some embodiments, a distance between adjacent display pixels 14 can be a distance between iLEDs that emit a same color of light 30 in each of the adjacent display pixels 14 from an edge or center of the iLEDs.

Variable-resolution camera 20 can comprise a camera substrate 22 and camera pixels 24 disposed on camera substrate 22. In embodiments of the present disclosure, camera pixels 24 can have a variable spatial resolution (e.g., a variable camera pixel 24 spacing) over camera substrate 22. Camera pixels 24 can be controllable to capture (e.g., absorb) light 30 to produce an electrical charge or current, for example converting a charge to a voltage using a pixel circuit local to each camera pixel 24. A variable-resolution camera 20 having a variable spatial resolution means that adjacent camera pixels 24 on camera substrate 22 can be separated by different spatial distances in a direction. For example, a first camera pixel 24 adjacent to a second camera pixel 24 can be separated by a first distance D3 in a direction (or dimension, shown in the left column of camera pixels 24 in the variable-resolution camera 20 inset) and a third camera pixel 24 can be separated from a fourth camera pixel 24 by a second distance D4 different from the first distance in the same direction (shown in the center column of camera pixels 24 on opposite sides of camera cluster controllers 26 in the variable-resolution camera 20 inset). Adjacent camera pixels 24 are camera pixels 24 between which no other camera pixel 24 on camera substrate 22 is present in a direction or dimension, for example orthogonal directions corresponding to rows and columns of camera pixels 24 in horizontal and vertical directions over camera substrate 22.

Camera pixel 24 can comprise a light-absorber, for example a photodiode or phototransistor (each referred to in short form as a "PD") that absorbs light 30 and produces electrical charge or current in response. A distance between adjacent camera pixels 24 can be a distance between the PDs in each of the adjacent camera pixels 24 from an edge or center of the PD. In some embodiments, camera pixel 24 can comprise multiple PDs that each absorb light 30 of a different color and produces an electrical current or charge in response. PDs that each absorb light 30 of a different color can, for example, comprise color filters. In some embodiments, a distance between adjacent camera pixels 24 can be a distance between PDs that absorb a same color of light 30 in each of the adjacent camera pixels 24 from an edge or center of the PDs.

In embodiments of the present disclosure, an optical system 36 images, conducts, or transmits light 30 emitted from variable-resolution display 10 onto variable-resolution camera 20 where light 30 is captured to produce an image on variable-resolution camera 20 corresponding to an image displayed on variable-resolution display 10. For example, optical system 36 can be an optical imaging system comprising a lens or collection of lenses or mirrors. An optical system 36 can comprise one or more optics (e.g., one or more lenses and/or one or more mirrors). Optical system 36 can be attached to or be a part of variable-resolution camera 20. Variable-resolution display 10 can comprise a collection of micro-light-emitting diodes (for example in a two-dimensional array) for displaying a display (input) image 32. Variable-resolution camera 20 can comprise a collection of CMOS photosensors (for example in a two-dimensional array) for capturing a camera (captured) image 34, for example from light provided from variable-resolution display 10.

Figure 2B:
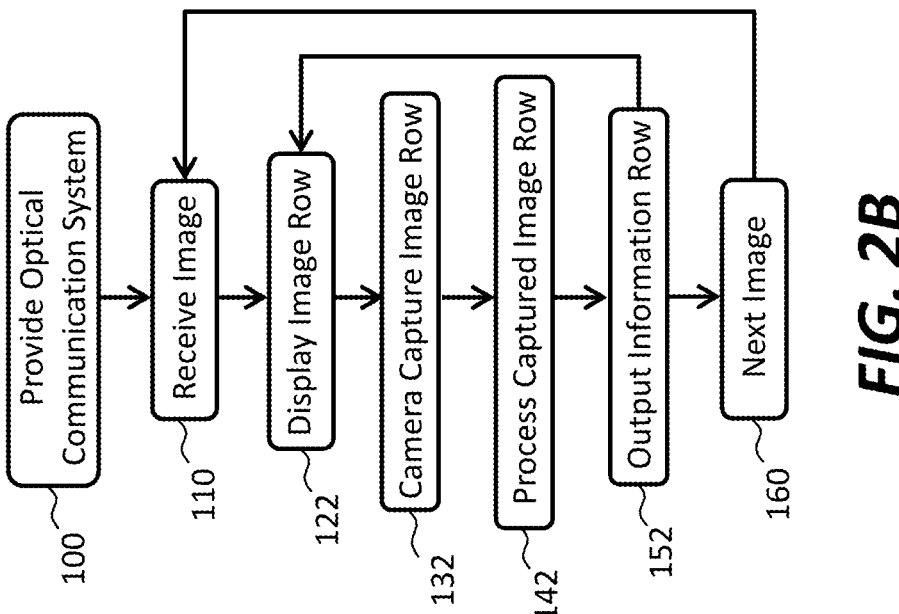
FIGS. 2A and 2B are flow diagrams of optical communication processes according to illustrative embodiments of the present disclosure.
Figure 2A:
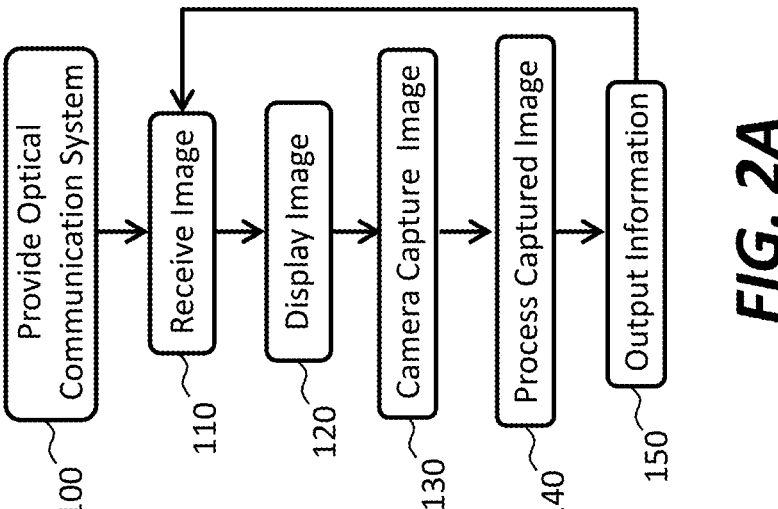

In operation, and as shown in FIG. 2A and according to methods of the present embodiment, variable-resolution optical communication system 90 operates by providing variable-resolution optical communication system 90 in step 100, receiving (inputting) an image (e.g., input image 32 comprising information from a computer or telecommunication system) with display 10 in step 110, and displaying input image 32 with display 10 in step 120. Display 10 emits light 30 corresponding to input image 32 with display pixels 14 that passes through optical system 36 to variable-resolution camera 20 and is captured by camera pixels 24 to form a captured image 34 in step 130. All of camera pixels 24 can be captured at a same time (e.g., as an image frame), within the limitations of control circuit and signal propagation times, for example using a mechanical or electronic shutter (disposed either locally or remotely). Captured image 34 can be processed in step 140 to extract the information and output the information in step 150, for example as an output image to a computer or telecommunication system connected to variable-resolution camera 20. The process can then repeat with a new input image 32 and new information. In embodiments, the displaying of an image using display 10 and recording of the image using variable-resolution camera 20 can be done an image at a time. Methods can comprise recording all of camera pixels 24 at a first time or during a first period before recording one or more of camera pixels 24 at a second time after the first time or during a second period after the first period.

In some embodiments and as shown in FIG. 2B, variable-resolution optical communication system 90 operates by providing variable-resolution optical communication system 90 in step 100, receiving (inputting) an image (e.g., an input image 32 comprising information) with display 10 in step 110, and displaying input image 32 with display 10 a row at a time in step 122. A row of display 10 emits light 30 corresponding to input image 32 with display pixels 14 that passes through optical system 36 to variable-resolution camera 20 that is captured by a row of camera pixels 24 in step 132, processed in step 142, and output in step 152, for example with or to a computer or telecommunication system connected to variable-resolution camera 20. The process can then repeat with a next row of image data. Once all of the rows of image data are displayed by display 10 and captured by corresponding rows of variable-resolution camera 20, the process can repeat with a new image. By displaying and capturing rows of an image at a time, the time required to display a row of an image into display 10 and capture the image row with variable-resolution camera 20 can be overlapped (e.g., occur at the same time as) the time required to load (e.g., input) the image row into display 10, unload (e.g., output) the image row from variable-resolution camera 20, and process the image (e.g., with variable-resolution camera 20 or a camera connected to variable-resolution camera 20). By temporally overlapping the steps, the data rate of variable-resolution optical communication 90 can be increased, improving performance. (The same method can be applied using sequential columns.) Such methods can take advantage of image display and capture methods that use matrix addressing to provide rows (or columns) of image data at a time (e.g., passive-matrix or active-matrix display or camera control methods). One or more camera pixels 24 can be a row (or column) of camera pixels corresponding to pixels in an image. The same process can be applied to multiple pixel rows at a time or to pixel clusters 40 at a time.

In some embodiments comprising a color display 10 and color variable-resolution camera 20, display 10 can display a color field of a color image at a time (e.g., with sequential color fields in a color image) and color variable-resolution camera 20 can sequentially capture one color at a time, thus allowing color-field display and color-field capture can temporally overlap. Since the color pixels in display 10 and variable-resolution camera 20 can operate independently, the color field display with display 10 and capture with variable-resolution camera 20 can occur at a same time for different color fields. For example, a red field of a first image can be displayed at a first time, the red field can be captured at a second time after the first time and a green field of the first image can be displayed at the second time, the green field can be captured at a third time after the second time and a blue field can be displayed at the third time, the blue field can be captured at a fourth time after the third time and a second red field can be displayed at the fourth time. The process then can repeat, thus using three frame times rather than six frame times to display and capture a color image.

Some embodiments of the present disclosure comprise temporally overlapping displaying a portion of an image and capturing a different portion of the image. For example, embodiments can comprise displaying a row (or multiple rows) of an image (e.g., with a display) and capturing (e.g., with a variable-resolution camera) a different row (or different multiple rows) of the image at least partially at a same time. In some embodiments, embodiments can comprise displaying a pixel cluster of an image (e.g., with a display) and capturing (e.g., with a variable-resolution camera) a different pixel cluster of the image at least partially at a same time. Some embodiments can comprise displaying (e.g., with a display) a color field of a color image and capturing (e.g., with a variable-resolution camera) a different color field of the color image at least partially at a same time.

In general, and according to embodiments of the present disclosure, camera pixels 24 can be controlled in a variety of ways, including using passive-matrix, active-matrix, or direct control, for example by a camera controller that receives signals from camera pixels 24 (e.g., through camera column controller 46C and camera row controller 46R comprising a camera controller). Similarly, and according to embodiments of the present disclosure, display pixels 14 can be controlled in a variety of ways, including using passive-matrix, active-matrix, or direct control, for example by a display controller that provides signals to display pixels 14.

Figure 3:
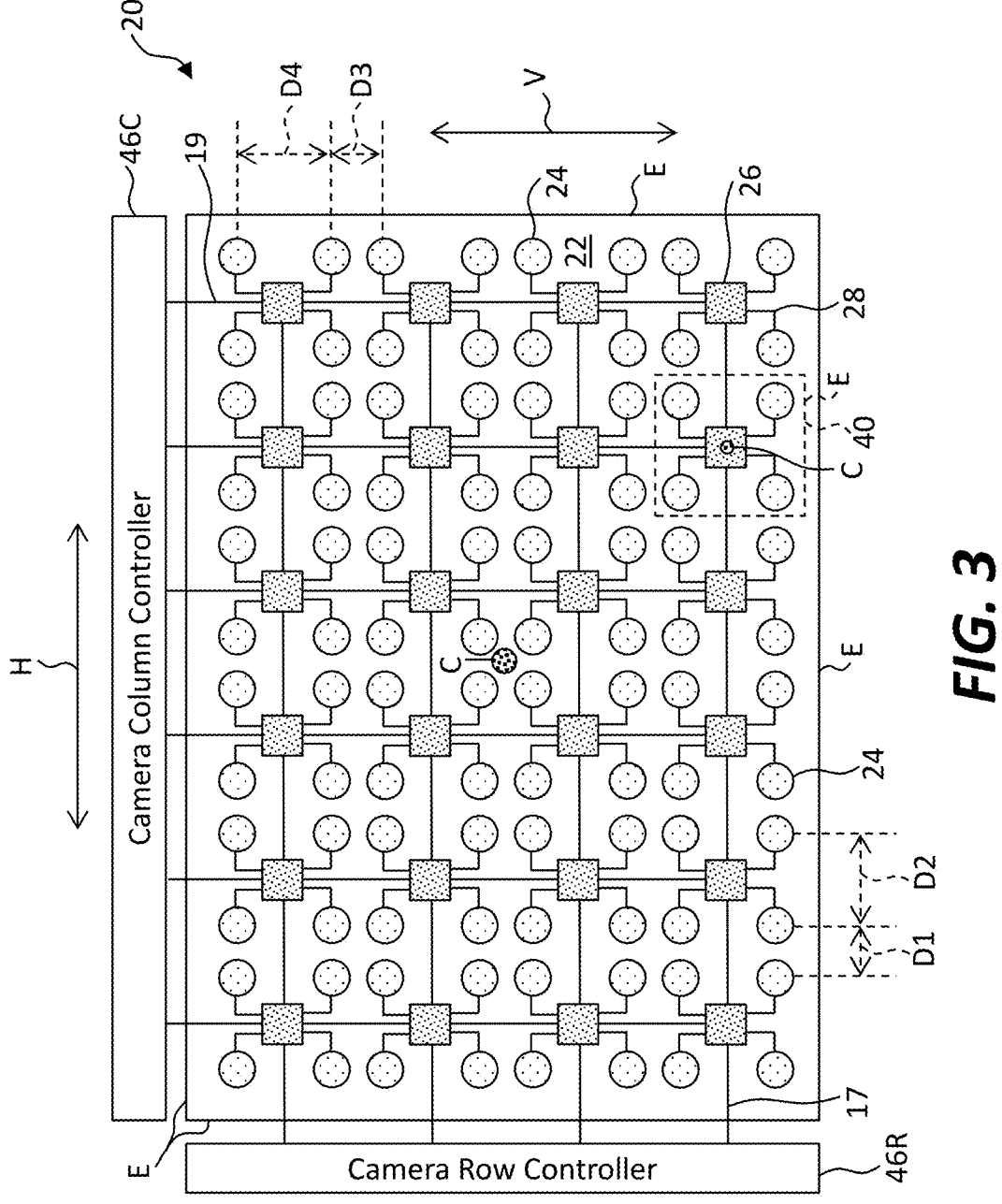
FIGS. 3 and 4 are schematic diagrams of variable-resolution cameras according to illustrative embodiments of the present disclosure.

FIGS. 1 and 3 illustrate embodiments of the present disclosure in which camera pixels 24 are disposed in pixel clusters 40. Each pixel cluster 40 can comprise a camera cluster controller 26 that controls camera pixels 24 in pixel cluster 40 through camera wires 28, for example using passive-matrix, active-matrix, or direct pixel control. Camera cluster controller 26 can comprise, for example circuits for accessing a voltage stored at each camera pixel 24, for example using direct or matrix control, and optionally signal converters or processors such as digital-to-analog converters, analog-to-digital voltage, charge, or current converters, or charge or voltage converters to convert binary or multi-bit digital values using electronic circuits. Camera cluster controller 26 can be disposed on camera substrate 22 between camera pixels 24 in the pixel cluster 40 and can be responsive to signals provided from a camera controller external to the camera pixels 24 (e.g., an area of camera substrate 22) or external to pixel clusters 40.

Similarly, FIG. 1 illustrates embodiments of the present disclosure in which display pixels 14 are disposed in pixel clusters 40. Each pixel cluster 40 can comprise a display cluster controller 16 operable to control display pixels 14 in pixel cluster 40 through display wires 18, for example using passive-matrix, active-matrix, or direct pixel control. Display cluster controller 16 can be disposed on display substrate 12 between display pixels 14 in pixel cluster 40.

As shown in FIG. 1, variable-resolution display 10 comprises pixel clusters 40 comprising nine display pixels 14 directly controlled by a display cluster controller 16 through camera wires 28 and variable-resolution camera 20 comprises pixel clusters 40 comprising nine camera pixels 24 directly controlled by a camera cluster controller 26 through display wires 18. As shown in FIG. 3, variable-resolution camera 20 pixel clusters 40 comprise four camera pixels 24 directly controlled by camera cluster controller 26 through camera wires 28. Pixel clusters 40 are disposed in a two-dimensional array over camera substrate 22 and connected in rows and columns with row wires 17 and column wires 19, respectively. FIG. 3 also illustrates camera row and column controllers 46R and 46C (e.g., comprising a camera controller) that control the array of pixel clusters 40 and operate variable-resolution camera 20.

FIG. 3 illustrates camera pixels 24 on camera substrate 22 having a variable, changing, or different spacing (e.g., has a variable resolution) in both the horizontal direction H and vertical direction V. Adjacent camera pixels 24 in adjacent pixel clusters 40 are separated by a first distance D1 and adjacent camera pixels 24 within pixel clusters 40 are separated by a second distance D2 different from D1 in the horizontal direction H in variable-resolution camera 20. Similarly, adjacent camera pixels 24 in adjacent pixel clusters 40 are separated by a third distance D3 and adjacent camera pixels 24 within pixel clusters 40 are separated by a fourth distance D4 different from D3 in the vertical direction V in variable-resolution camera 20. In some embodiments, the different separation distances are a consequence of disposing camera cluster controller 26 between and spatially close to camera pixels 24 within a pixel cluster 40, enabling camera pixel 24 control or response at a higher frequency. Adjacent pixel clusters 40 are pixel clusters 40 over camera substrate 22 between which there are no other pixel clusters 40.

Figure 4:
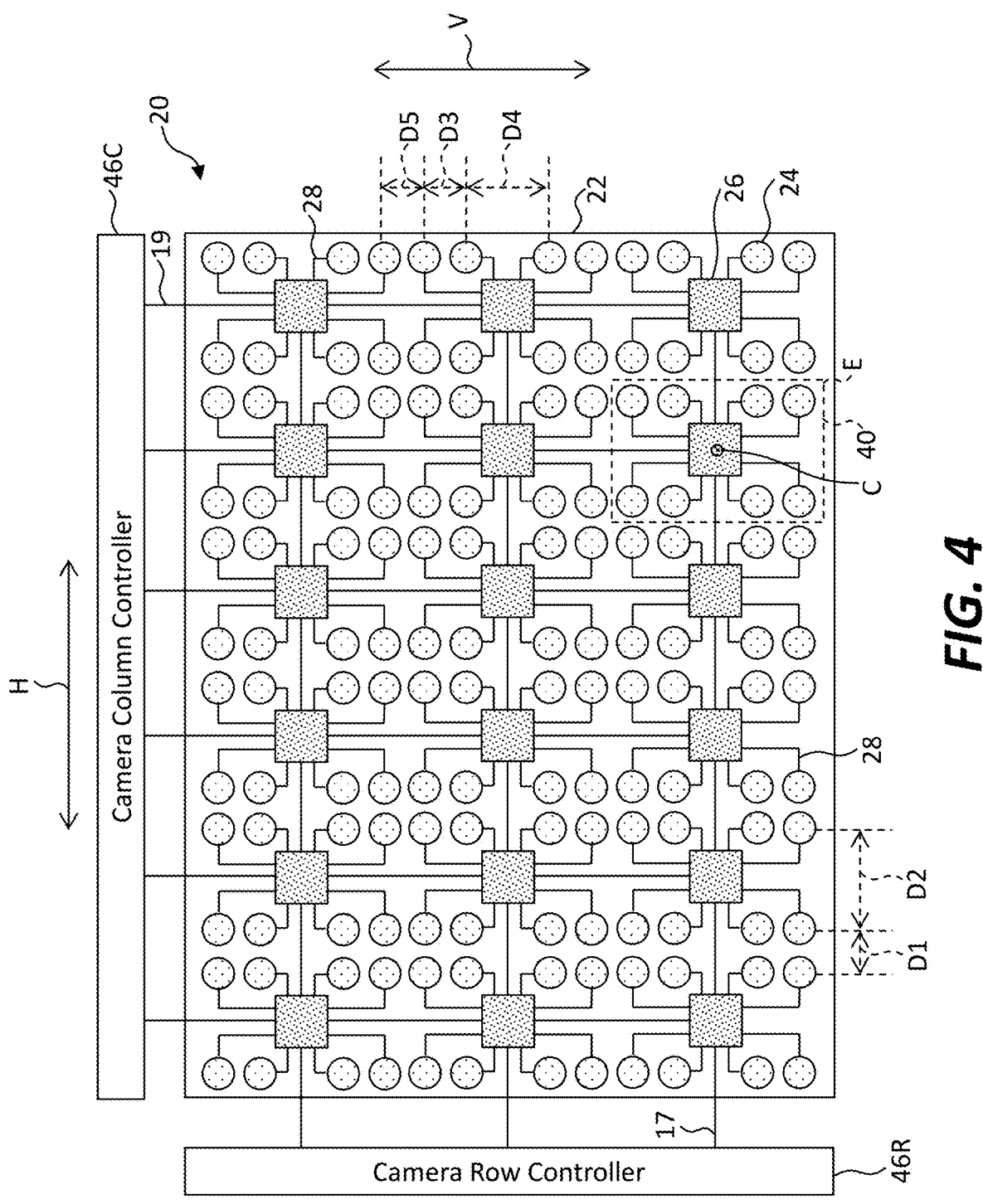
Figure 5B:
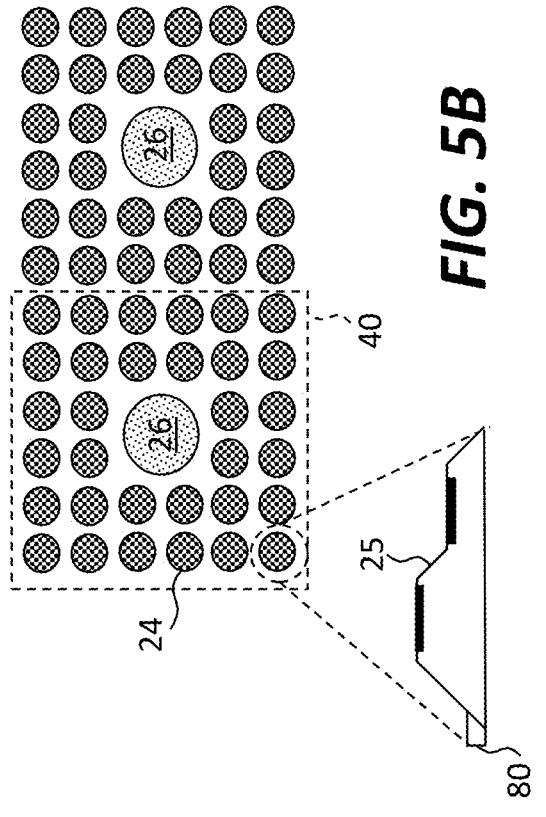
FIGS. 5A and 5B are schematic diagrams of pixel clusters in variable-resolution cameras according to illustrative embodiments of the present disclosure.
Figure 5A:
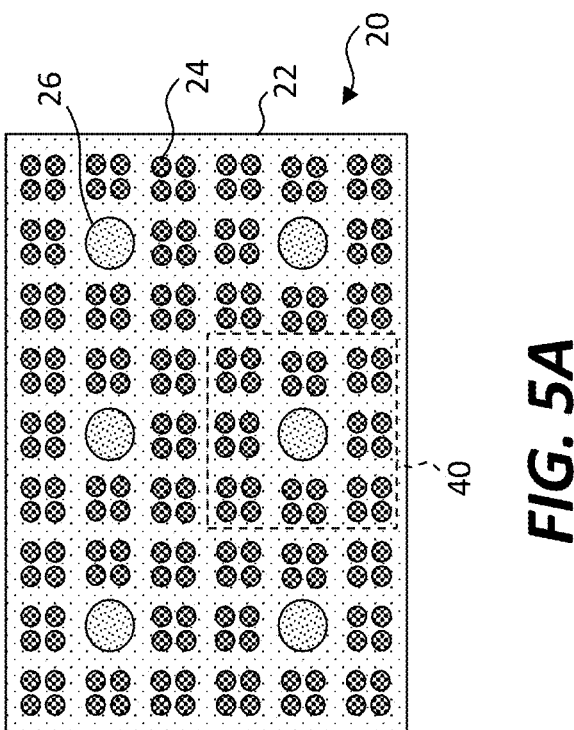

Pixel clusters 40 of FIG. 3 each comprise four camera pixels 24. As shown in FIG. 4 and in some embodiments, pixel clusters 40 each comprise eight camera pixels 24 disposed in a two-by-four array (in horizontal by vertical dimensions). Adjacent camera pixel 24 spacing in horizontal direction H is as described with respect to FIG. 3 with first and second distances D1 and D2 but the spacing of adjacent camera pixels 24 in vertical direction V in FIG. 4 is more variable. As shown in FIG. 4, in vertical direction V some adjacent camera pixels 24 within pixel cluster 40 are spaced by third distance D3 and some are spaced by fourth distance D4. Distance D3 can be different from distance D4, for example because of camera cluster controller 26 between camera pixels 24 within pixel cluster 40. Adjacent camera pixels 24 in different adjacent pixel clusters 40 can be separated by a fifth distance D5 that can be different from third and fourth distances D3, D4, for example because of space limitations on camera substrate 22 for wires (e.g., column wires 19, row wires 17, and camera wires 28). In some embodiments, distances D3 and D5 can be the same. FIG. 5A and the more detailed FIG. 5B illustrate embodiments in which each pixel cluster 40 of variable-resolution camera 20 comprises thirty-two camera pixels 24 in an array centered on camera cluster controller 26. Camera pixels 24 can be grouped in spatially separated two-by two arrays as in FIG. 5A or not, as in FIG. 5B. Different spatial separations of adjacent camera pixels 24 are evident in both FIGS. 5A and 5B.

Figure 6:
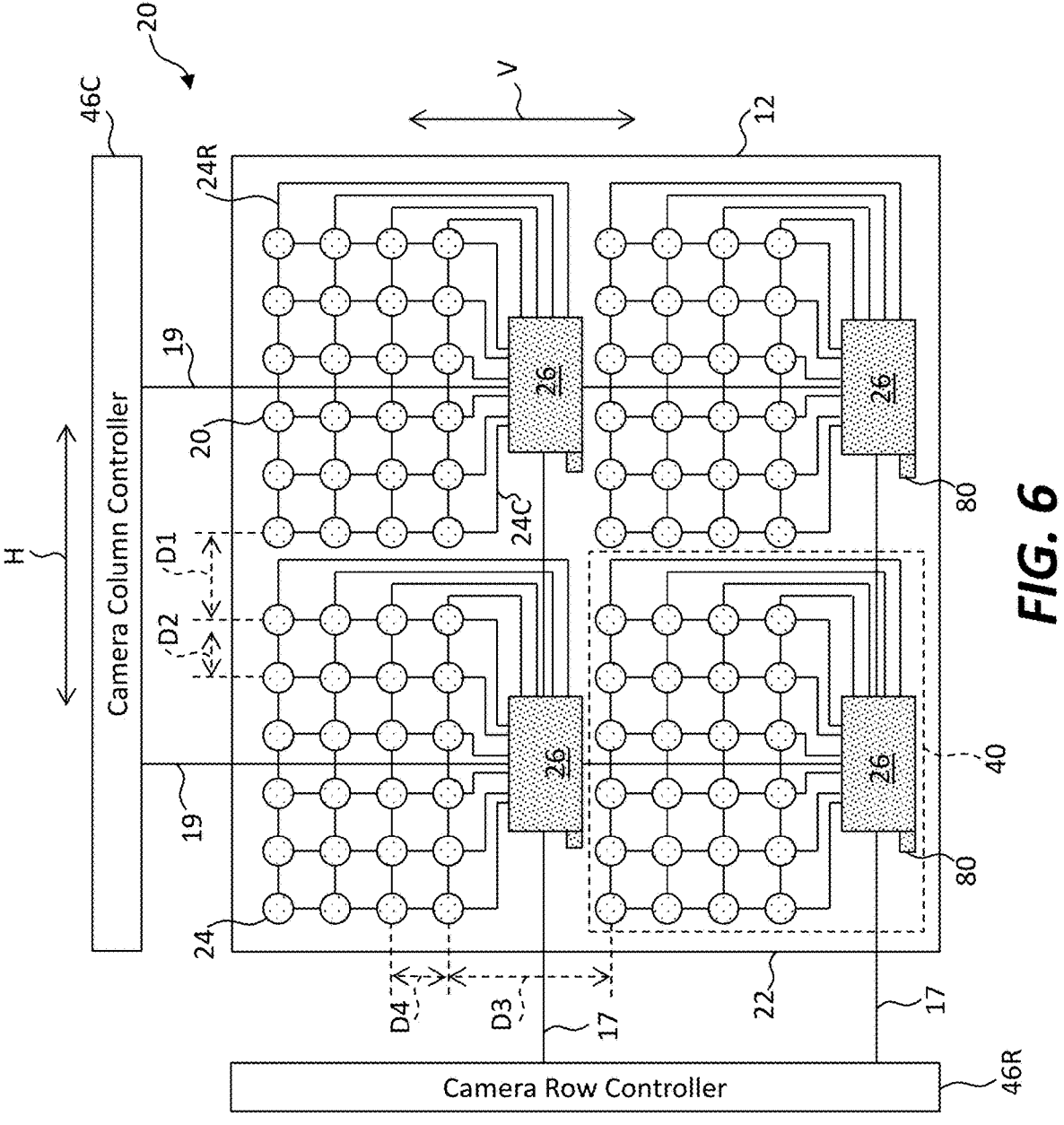
FIG. 6 is a schematic diagram of a variable-resolution camera with pixel clusters comprising matrix-controlled pixels and camera cluster controllers according to illustrative embodiments of the present disclosure.

FIGS. 3 and 4 illustrate embodiments in which camera pixels 24 are directly controlled by camera cluster controller 26, e.g., without matrix control. In some embodiments and as illustrated in FIG. 6, camera pixels 24 in pixel clusters 40 are controlled using either passive-matrix or active-matrix control using cluster row wires 24R connecting rows of camera pixels 24 and cluster column wires 24C connecting columns of camera pixels 24 in pixel cluster 40. (Cluster row and column wires 24R, 24C can be camera wires 28 connecting camera pixels 24 to camera cluster controllers 26.) Camera cluster controller 26 is disposed at one side (e.g., the bottom) of each pixel cluster 40 but could be located at the top, left, or right of pixel cluster 40 or between camera pixels 24 within pixel cluster 40. In any case, in horizontal direction H adjacent camera pixels 24 between adjacent pixel clusters 40 can be separated by first distance D1 and adjacent camera pixels 24 within a pixel cluster 40 can be separated by second distance D2 different from first distance D1. Similarly, in vertical direction V adjacent camera pixels 24 between adjacent pixel clusters 40 can be separated by third distance D3 and adjacent camera pixels 24 within pixel cluster 40 can be separated by fourth distance D4 different from third distance D3. Thus, camera pixels 24 have different spatial separations and therefore a variable resolution to accommodate space on camera substrate 22 for camera cluster controller 26 and cluster row and column wires 24R and 24C. As shown in FIGS. 6, D1 and D3 are larger than D2 and D4, respectively. In embodiments with camera cluster controller 26 disposed on camera substrate 22 between camera pixels 24 in a common pixel cluster 40, D1 and D3 might be smaller than D2 and D4, respectively (as in FIG. 3).

Figure 7:
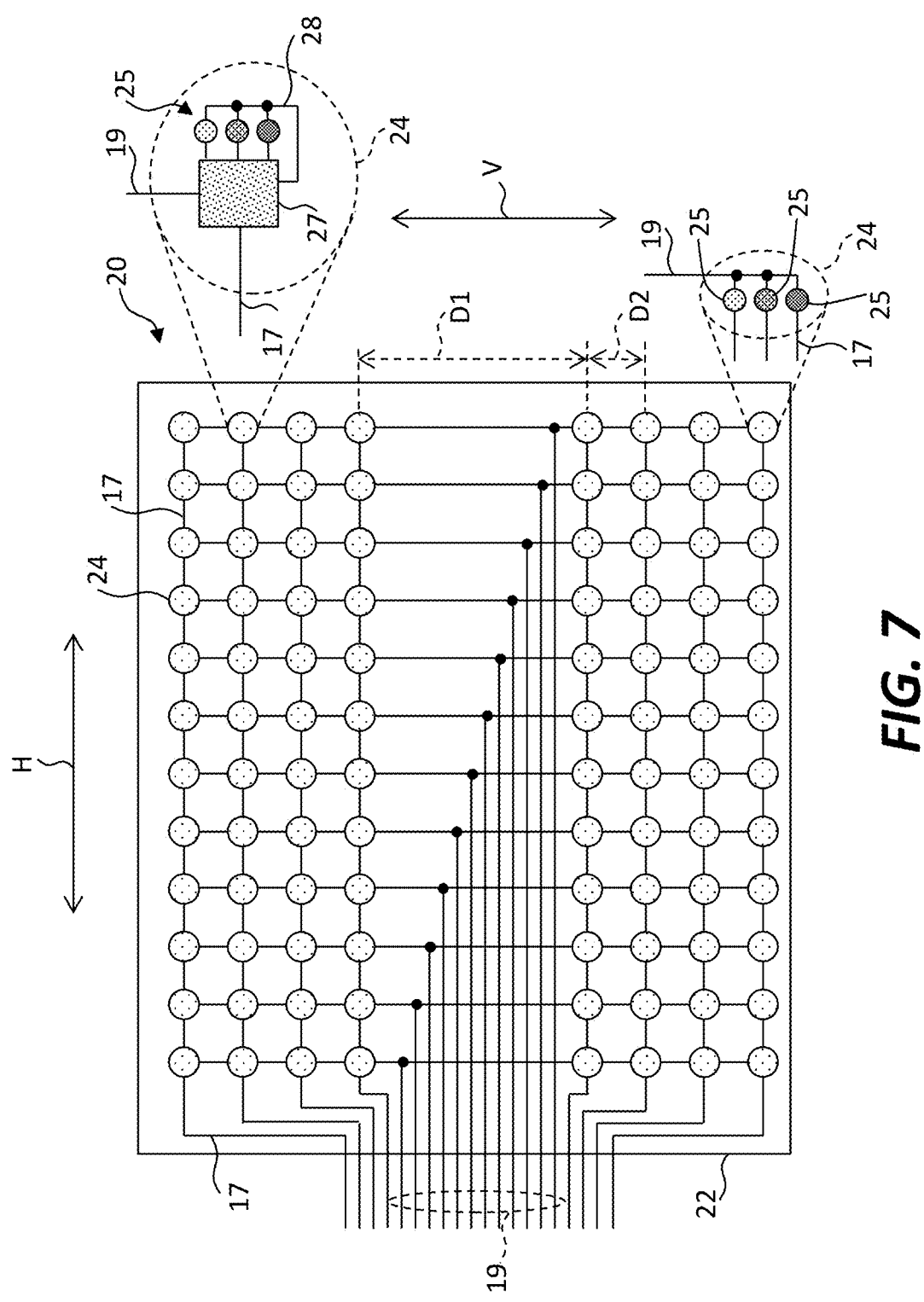
FIG. 7 is a schematic diagram of a variable-resolution camera with passive-matrix-controlled pixels and wires but without camera cluster controllers between the camera pixels according to illustrative embodiments of the present disclosure.

FIG. 7 illustrates a camera 20 of the present disclosure in which camera pixels 24 are controlled by a camera controller external to an area comprising camera pixels 24 (e.g., comprising camera column controller 46C and camera row controller 46R and any additional circuits needed to control variable-resolution camera 20) and optionally external to camera substrate 22 using either passive-matrix control or active-matrix control but without camera pixel clusters 40 or a camera cluster controller 26 that controls multiple camera pixels 24 in a camera pixel cluster 40. Instead, an external camera controller (e.g., comprising camera row and column controllers 46R, 46C as in FIGS. 3, 4, and 6) can provide row select and column data signals on row and column wires 17, 19 directly to camera pixels 24 in either an active-matrix or passive-matrix configuration. In embodiments as illustrated in the upper inset, each camera pixel 24 comprises a camera pixel controller 27 (e.g., a pixel control circuit that converts charge from a photosensor to a voltage) for a single camera pixel 24 providing active-matrix control of camera pixel 24 and light-absorbers (e.g., photodiodes 25) that absorb (e.g., capture or record) light 30 in response to or under the control of signals provided by camera pixel controller 27, for example to multiplex the voltage signal by row and column. Camera pixels 24 can comprise one or more light-absorbers, for example a red-light absorber, a green-light absorber, a blue-light absorber, or a combination thereof, for example that is/are controlled by camera pixel controller 27 in an active-matrix camera pixel 24. In embodiments and as illustrated in the lower inset, each camera pixel 24 comprises one or more light-absorbers (e.g., photodiodes 25) that absorb light 30 in response to or under the control of passive-matrix control signals provided by an external camera controller (e.g., comprising camera column controller 46C and camera row controller 46R).

Camera pixels 24 can comprise one or more light-absorbers, for example a red-light absorber, green-light absorber, blue-light absorber, or combination thereof. Camera cluster controllers 26 associated with camera pixels 24 and row and column wires 17, 19 can cover space over camera substrate 22 that inhibits a fixed regular arrangement of equally spaced camera pixels 24 at a high resolution over camera substrate 22. Instead, by using embodiments of the present disclosure in a variable-resolution camera 20, an increased number of camera pixels 24 can be disposed over camera substrate 22 with variable spacing, increasing the amount of information (e.g., data or bits of information) that can be communicated to and received by variable-resolution camera 20. For example, adjacent camera pixels 24 that are not separated by multiple wires (e.g., a bus comprising row and column wires 17, 19) can be more closely spaced on camera substrate 22 than adjacent camera pixels 24 that are separated by multiple wires (e.g., a bus comprising row and column wires 17, 19).

According to embodiments of the present disclosure, either or both of wires (e.g., row and column wires, 17, 19 or camera wires 28) and pixel controllers (e.g., camera cluster controllers 26) disposed on camera substrate 22 within a camera pixel 24 area (e.g., a convex hull including all camera pixels 24 on camera substrate 22), for example between adjacent camera pixels 24, can spatially separate camera pixels 24 and result in a variable spacing between adjacent camera pixels 24. Some camera pixels 24 can be spatially farther apart than other camera pixels 24 because some camera pixels 24 can be separated, for example by wires or pixel control circuits, than other camera pixels 24 that are not. In embodiments, variable-resolution cameras 20 can have camera substrates 22 with fewer layers (e.g., for wiring) or fewer control circuits (e.g., comprising thin-film circuits or circuits native to camera substrate 22) and therefore reduced manufacturing costs. In some embodiments, portions of a variable-resolution camera 20 has reduced resolution to reduce the amount of information gathered and increase the speed or frame rate of a camera. For example, where a camera captures an image corresponding to a user's gaze, fewer camera pixels 24 at a periphery of the user's view can be necessary and more camera pixels 24 at the center of the user's gaze can be helpful.

In some embodiments control circuits (e.g., camera cluster controllers 26) can be non-native to camera substrate 22, can be disposed on camera substrate 22 by micro-transfer printing camera cluster controllers 26 from a source wafer to camera substrate 22, and can be electrically connected to camera pixels 24 or external camera control circuits (e.g., row and column controllers 46R, 46C) with thin-film interconnects (e.g., electroplated on a patterned seed layer). Because camera cluster controllers 26 can be non-native to and micro-transfer printed onto camera substrate 22, camera cluster controllers 26 can comprise a broken or separated tether 80 (as shown in FIG. 6).

Display pixels 14 and camera pixels 24 are generically pixels 50. Display cluster controllers 16 and camera cluster controllers 26 are generically cluster controllers 60. Display substrate 12 and camera substrate 22 are generically substrates 70.

Variable-resolution camera 20 or variable-resolution display 10 can have a spatially dependent variable resolution or pixels 50 can have a variable spacing in which some adjacent pixels 50 are spaced farther apart than other adjacent pixels 50. In some embodiments, a camera circuit (e.g., camera cluster controller 26) or a display circuit (e.g., display cluster controller 16) (or circuit wiring) can be disposed on a substrate 70 between pixels 50 on substrate 70, for example at or near a center C of substrate 70 or at an edge E of substrate 70 or within a camera or display pixel cluster 40.

In some embodiments, camera pixels 24 closer to or at an edge E of camera pixel clusters 40 can have a higher or greater resolution or be spaced closer together (absolutely or on average) than camera pixels 24 closer to a center C of camera pixel clusters 40, for example to accommodate camera cluster controllers 26 disposed near or at center C of camera substrate 22 or camera pixel clusters 40. Consequently, in some embodiments, fewer camera pixels 24 per unit area of camera substrate 22 are disposed closer to a center C of camera substrate 22 than to an edge E of camera substrate 22 or fewer camera pixels 24 per unit area of camera substrate 22 can be disposed in a cluster 40 of camera pixels 24 than at an edge E of camera substrate 22.

As shown in FIGS. 3, 4, and 7, camera pixels 24 closer to or at an edge E of camera substrate 22 or a display area defined by camera pixels 24 (e.g., a convex hull comprising camera pixels 24) can have a greater resolution or be spaced closer together (absolutely or on average) than camera pixels 24 closer to a center C of camera substrate 22 or a display area defined by camera pixels 24 (e.g., a convex hull comprising camera pixels 24).

In some embodiments, adjacent camera pixels 24 closer to or at an edge E of camera pixel clusters 40 can have a lower resolution or be spaced farther apart (absolutely or on average) than adjacent camera pixels 24 closer to a center C of camera pixel clusters 40, for example to accommodate camera cluster controllers 26 disposed near or at edge E of camera substrate 22 or camera pixel clusters 40 or between camera pixel clusters 40. Consequently, in some embodiments, more camera pixels 24 per unit area of camera substrate 22 are disposed closer to a center C of camera substrate 22 than to an edge E of camera substrate 22 or more camera pixels 24 per unit area of camera substrate 22 can be disposed in a cluster 40 of camera pixels 24 than at an edge E of camera substrate 22 or between camera pixel clusters 40.

As shown in FIG. 6, camera pixels 24 closer to or at an edge E of camera substrate 22 or pixel cluster 40 or a display area defined by camera pixels 24 (e.g., a convex hull comprising camera pixels 24) can have a lower resolution or be spaced farther apart (absolutely or on average) than camera pixels 24 closer to a center C of camera substrate 22 or pixel cluster 40 or a display area defined by camera pixels 24 (e.g., a convex hull comprising camera pixels 24) or within a camera pixel cluster 40.

Light 30 from display 10 (e.g., images displayed on display 10) can be imaged (e.g., exposed onto) camera pixels 24 of variable-resolution camera 20 using optical system 36, for example one or more optics. In some embodiments, for example as illustrated in FIG. 1, the variable spatial resolution of the display pixels 14 can be spatially matched to the variable spatial resolution of camera pixels 24. For example, the layout, position, or arrangement of camera pixels 24 on camera substrate 22 can match the layout, position, or arrangement of display pixels 14 on display substrate 12. For example, the variable spatial resolution or location of display pixels 14 with respect to each other can be the same as or similar, for example geometrically similar to, the variable spatial resolution or location of camera pixels 24 with respect to each other, that is differing in relative size but not relative location. In some embodiments, the size and location of display pixels 14 on display substrate 12 is the same as the size and location of camera pixels 24 on camera substrate 22. In some embodiments, the spacing of display pixels 14 on display substrate 12 is the same as the spacing of camera pixels 24 on camera substrate 22. In some embodiments, the size and location of display pixels 14 on display substrate 12 is a multiplicative factor of the size and location of camera pixels 24 on camera substrate 22. In some embodiments, the location of display cluster controllers 16 with respect to display pixels 14 on display substrate 12 is similar to the location of camera cluster controllers 26 with respect to camera pixels 24 on camera substrate 22. In some embodiments, the number of display pixels 14 controlled by each display cluster controllers 16 is the same as the number of camera pixels controlled by camera cluster controllers 26. In some embodiments, the number of camera pixels controlled by camera cluster controllers 26 is an integer value factor greater than one of the number of display pixels 14 controlled by each display cluster controllers 16 in one dimension or in two dimensions. In some embodiments, each display pixel cluster 40 is geometrically similar to a camera pixel cluster 40, for example the relative location of each display pixel 14 in a display pixel cluster 40 is the same as the relative location of each camera pixel 24 in a camera pixel cluster 40, the relative location of each display cluster controller 16 in a display pixel cluster 40 is the same as the relative location of each camera cluster controller 26 in a camera pixel cluster 40, and the relative location of each display cluster controller 16 with respect to display pixels 14 in a display pixel cluster 40 is the same as the relative location of each camera cluster controller 26 with respect to camera pixels 24 in a camera pixel cluster 40. Relative can mean the same except for magnitude or having the same order in one dimension or in two dimensions.

Figure 9:
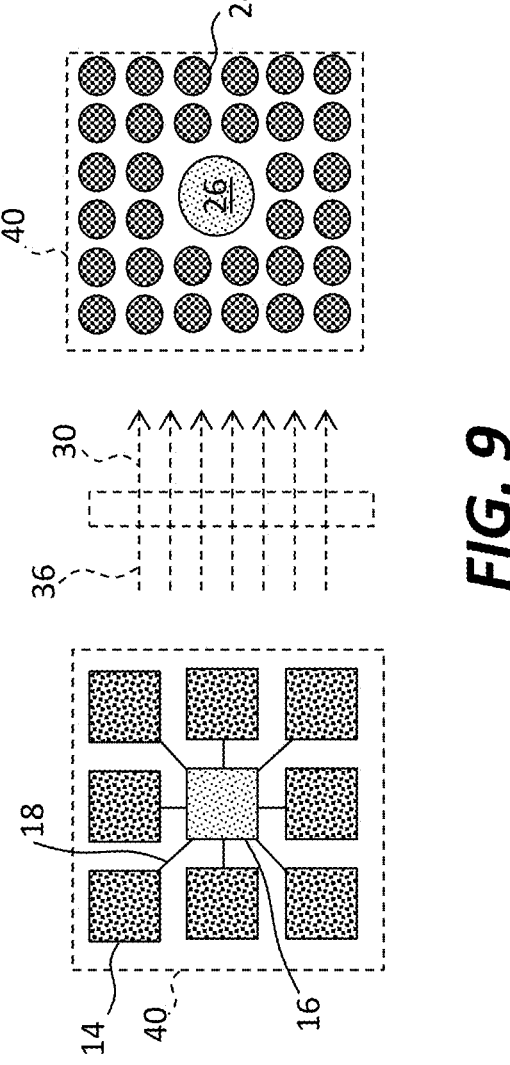
FIG. 9 is a schematic diagram of a display pixel cluster optically exposed onto a camera pixel cluster.

In some embodiments and as illustrated in FIG. 8A, each display pixel 14 is optically exposed (e.g., by optical system 36) onto a single camera pixel 24. In some embodiments, each display pixel 14 is optically exposed (e.g., by optical system 36) onto at least one camera pixel 24. In some embodiments and as illustrated in FIG. 8B, each display pixel 14 is optically exposed (e.g., by optical system 36) onto multiple adjacent camera pixels 24 in one dimension or in two dimensions so that the multiple adjacent camera pixels 24 form a one-dimensional array or a two-dimensional array responsive to light 30 emitted from a single or fewer display pixels 14. In some embodiments and as illustrated FIG. 8C, light 30 from each display pixel 14 of display 10 is optically exposed (e.g., by optical system 36) onto a corresponding pixel cluster 40 of variable-resolution camera 20. In some embodiments and as illustrated in FIG. 9, light 30 from each pixel cluster 40 of display 10 is optically exposed (e.g., by optical system 36) onto a corresponding pixel cluster 40 of variable-resolution camera 20. Camera pixel cluster 40 can comprise more camera pixels 24 than display pixel cluster 40 has display pixels 14.

According to embodiments of the present disclosure and as illustrated in FIGS. 1, 3-4, and 6-7, a variable-resolution camera 20 can comprise a camera substrate 22 and camera pixels 24 disposed on camera substrate 22. In embodiments of the present disclosure, camera pixels 24 have a variable spatial resolution (e.g., a variable camera pixel 24 spacing) over camera substrate 22 and are controllable to capture light, for example with a camera controller external to camera substrate 22, a camera controller on camera substrate 22 but external to a convex hull comprising camera pixels 24, or using camera cluster controllers 26 associated with each camera pixel 24 or with pixel clusters 40 of camera pixels 24.

Some embodiments of the present disclosure comprise a camera pixel cluster 40 comprising a camera cluster controller 26 disposed on camera substrate 22 between camera pixels 24, for example adjacent camera pixels 24 in different adjacent camera pixel clusters 40 or between camera pixels 24 within a pixel cluster 40. Camera cluster controller 26 can be operable to control two or more camera pixels 24, for example to absorb light. Camera pixels 24 can comprise one or more light absorbers, e.g., photodiodes. If camera pixels 24 comprise multiple light absorbers, the light absorbers can each absorb a different color of light. Camera cluster controllers 26 and light absorbers (e.g., photodiodes) can be micro-transfer printed onto camera substrate 22 and can each comprise a broken (e.g., fractured) or separated tether 80 as a consequence of micro-transfer printing.

In embodiments of the present disclosure, the spacing (e.g., spatial separation) between adjacent camera pixels 24 within camera pixel clusters 40 are the same or different in one dimension or in two dimensions, the spacing (e.g., spatial separation) between adjacent camera pixels 24 within camera pixel clusters 40 are the same or different in one dimension or in two dimensions, but at least one pair of adjacent camera pixels 24 are separated by a different distance than another pair of adjacent camera pixels 24 (that can include a common camera pixel 24). Some embodiments of the present disclosure comprise multiple camera pixel clusters 40 and the spacing between at least some adjacent camera pixels 24 within a camera pixel cluster 40 is different from the spacing of adjacent camera pixels 24 in different adjacent camera pixel clusters 40 in one dimension or in two dimensions.

In embodiments of the present disclosure, a variable-resolution camera 20 (e.g., a digital variable-resolution camera 20) can comprise a camera substrate 22 having edges (sides) E and a center C and camera pixels 24 disposed on camera substrate 22. Variable-resolution camera 20 and camera pixels 24 can comprise three or more camera pixels 24 that have a variable spatial resolution or variable spatial separation over camera substrate 22 in a direction (e.g., dimension). Camera pixels 24 of variable-resolution camera 20 distributed over camera substrate 22 are separated by different amounts (different distances) in the direction (e.g., a horizontal direction H or vertical direction V parallel to a surface of camera substrate 22 such as an x or y dimension). In such a variable-resolution camera 20, camera pixels 24 are not spatially arranged over camera substrate 22 in a completely regular array in which all camera pixels 24 are separated by the same separation distance in each of two dimensions but are spatially arranged over camera substrate 22 in at least a partially irregular spatial arrangement or multiple different regular arrangements in at least one dimension. An irregular arrangement can be an arrangement that is not completely spatially regular over camera substrate 22 so that at least two camera pixels 24 are separated by a first distance, for example D1, and two other camera pixels 24 are separated by a second distance, for example D2, that is different from the first distance D1 in a single, common direction. In some embodiments, camera pixels 24 have an irregular arrangement and are separated by different distances in each of two orthogonal directions (e.g., horizontal direction H and vertical direction V).

Similarly, in some embodiments a variable-resolution display 10 (a display 10) can comprise a display substrate 12 having edges (sides) E and a center C and display pixels 14 disposed on display substrate 12. Variable-resolution display 10 and display pixels 14 can comprise three or more display pixels 14 that have a variable spatial resolution over display substrate 12 in a direction (e.g., dimension). Display pixels 14 of variable-resolution display 10 distributed over display substrate 12 are separated by different amounts (different distances) in the direction (e.g., a horizontal direction H or vertical direction V parallel to a surface of display substrate 12 such as an x or y dimension). In such a variable-resolution display 10, display pixels 14 are not spatially arranged over display substrate 12 in a completely regular array in which all display pixels 14 are separated by the same separation distance but are spatially arranged over display substrate 12 in at least a partially irregular spatial arrangement or multiple different regular arrangements. An irregular arrangement can be an arrangement that is not completely spatially regular over display substrate 12 so that at least two display pixels 14 are separated by a first distance, for example D1, and at least two other display pixels 14 are separated by a second distance, for example D2, that is different from the first distance D1 in a single, common direction. In some embodiments, display pixels 14 have an irregular arrangement and are separated by different distances in each of two orthogonal directions (e.g., horizontal direction H and vertical direction V).

In some embodiments, multiple pixel clusters 40 can each comprise an exclusive subset of camera pixels 24 in variable-resolution camera 20 or an exclusive subset of display pixels 14 in variable-resolution display 10. Camera pixels 24 can be exclusively connected to and controlled by a camera cluster pixel controller 26 in each camera pixel cluster 40. Display pixels 14 can be exclusively connected to and controlled by a cluster display cluster controller 16 in each display pixel cluster 40. Cluster controllers 60 can control multiple pixels in a pixel cluster 40. In some embodiments, cluster controller 60 (e.g., camera cluster controller 26 or display cluster controller 16) can provide active-matrix control or passive-matrix control of pixels 50 (e.g., camera pixels 24 or display pixels 14) in pixel clusters 40.

Camera pixels 24 in variable-resolution camera 20 can be substantially identical, e.g., within manufacturing limits. Similarly, display pixels 14 in variable-resolution display 10 can be substantially identical, e.g., within manufacturing limits. In some embodiments, variable-resolution camera 20 or variable-resolution display 10 can, independently, comprise no fewer than 9, 16, 25, 100, 400, 900, 1600, 2500, 5625, or 10000 pixels 50, respectively, arranged in rows or columns having no fewer than 3, 5, 10, 25, 100, 200, 300, 400, or 500 pixels 50 in each row or column. In some embodiments, pixels 50 are arranged in both rows and columns and have variable separation distances in a row direction (e.g., horizontal direction) and have variable separation in a column direction orthogonal to the row direction (e.g., vertical direction V). Variable-resolution cameras 20 or displays 10 can have the same number or a different number of pixels 50 in rows as in columns. Pixels 50 can be arranged regularly in one of the first and second directions or can be arranged irregularly in both the first and second directions. First and second directions can be horizontal and vertical directions or x and y directions, for example both parallel to a surface of substrate 70 on which pixels 50 are disposed.

In embodiments, despite the irregular arrangement of at least some display pixels 14 in at least one direction, variable-resolution display 10 can display a single image comprising data for each display pixel 14 and each display pixel 14 is substantially similarly controlled, albeit with different pixel data, to display the single image. Thus, in embodiments, display pixels 14 are functionally substantially similar or the same, operate substantially similarly or the same in response to pixel data, for example the same or similar pixel data, and provide substantially a similar or same function, e.g., displaying image data, where the image data comprises pixel data for each display pixel 14 in an image displayed on variable-resolution display 10. In embodiments, pixel data in an image can comprise a different or same value for any display pixels 14 displayed on variable-resolution display 10.

According to embodiments of the present disclosure, all of display pixels 14 are controlled to emit light 30 in response to a single constant image frame for a frame period of time, for example using display cluster controllers 16. Different images can be displayed with display pixels 14 of variable-resolution display 10 during different frame periods, for example successive frame periods as in a video or film. Successive frame periods can have a constant duration, e.g., the frame periods can all have the same temporal duration (can take or extend over the same time). In some embodiments, the frame periods all have at least a minimum temporal duration, for example a time required to update (display) all of display pixels 14 in variable-resolution display 10 or a time required to store image data for all of display pixels 14, e.g., stored in a frame store associated with or comprised in variable-resolution display 10, stored in a memory in display cluster controllers 16, or stored in a memory in display cluster controllers 16. In some embodiments, the frame periods have variable temporal duration but all at least are no less than the minimum temporal duration.

Similarly, in embodiments, despite the irregular arrangement of at least some camera pixels 24 in at least one direction, variable-resolution camera 20 can capture or record a single image comprising data for each camera pixel 24 and each camera pixel 24 is substantially similarly controlled, albeit with different pixel data, to absorb, record, or capture the single image. Thus, in embodiments, camera pixels 24 are functionally substantially similar or the same, operate substantially similarly or the same in response to pixel data, for example the same or similar pixel data, and provide substantially a similar or same function, e.g., recording or capturing image data, where the image data comprises pixel data for each camera pixel 24 in an image exposed onto variable-resolution camera 20. In embodiments, pixel data in an image can comprise a different or same value for any camera pixels 24 captured or recorded on variable-resolution camera 20.

According to embodiments of the present disclosure, all of camera pixels 24 are controlled to capture light 30 in response to a single constant image exposed onto camera pixels 24 from display 10 for a frame period of time, for example using camera cluster controllers 26 or display cluster controllers 16. Different images can be recorded with camera pixels 24 of variable-resolution camera 20 during different frame periods, for example successive frame periods as in a video or film. Successive frame periods can have a constant duration, e.g., the frame periods can all have the same temporal duration (can take or extend over the same time). In some embodiments, the frame periods all have at least a minimum temporal duration, for example a time required to update (capture) all of camera pixels 24 in variable-resolution camera 20 or a time required to store captured image 34 data for all of camera pixels 24, e.g., stored in a frame store associated with or comprised in variable-resolution camera 20, or stored in a memory in camera cluster controllers 26. In some embodiments, the frame periods have variable temporal duration but all at least are no less than the minimum temporal duration. In some embodiments, the temporal frame rate for variable-resolution camera 20 is the same as or greater than the temporal frame rate for variable-resolution display 10 (e.g., the frame period for variable-resolution camera 20 is equal to or less than the frame period for variable-resolution display 10).

A single image frame comprises pixel data displayed for a frame period during which each display pixel 14 in variable-resolution display 10 emits light 30 or camera pixel 24 in variable-resolution camera 20 captures light 30 corresponding to a pixel value of the single constant image frame. In embodiments, the pixel data (pixel value) during the frame period does not change (although some embodiments require that light 30 is emitted or captured for only a portion of the frame period, for example with passive-matrix control in which light 30 is emitted or captured in successive rows or with active-matrix control which the data is updated by or stored in successive rows.

In embodiments, the image frame data (the picture, image, pixel values, or pixel data) supplied to variable-resolution display 10 or captured by variable-resolution camera 20 does not change during the frame period. In this example, the frame period is defined as the temporal period during which the image frame data does not change. Thus, display pixels 14 or camera pixels 24 can be controlled to emit or capture light 30 in response to an unchanging, constant image frame comprising an image pixel value for each display pixel 14 or camera pixel 24 during a temporal frame period.

Adjacent pixels 50 are two pixels 50 between which there are no other pixels 50 in a direction, e.g., a horizontal or a vertical direction H, V. Adjacent pixel clusters 40 are two pixel clusters 40 between which there are no other pixel clusters 40 in a direction, e.g., a horizontal or a vertical direction H, V. The horizontal direction H can be orthogonal to the vertical direction V. In some embodiments, the separation distances D1 and D2 in horizontal direction H can be the same as the separation distances D3 and D4 in vertical direction V. In some embodiments, the separation distances D1 and D2 in horizontal direction H can be different from the separation distances D3 and D4 in vertical direction V. Pixels 50 separated by distance D1 can have one pixel 50 in common with pixels 50 separated by distance D2 (as illustrated in FIGS. 1, 3, 4, 6-7) or can have pixels 50 in common.

In some embodiments, pixels 50 are arranged in two orthogonal directions and are spatially arranged in an irregular arrangement in at least one direction. In some embodiments, pixels 50 are arranged in two orthogonal directions and are spatially arranged in an irregular arrangement in both orthogonal directions.

In some embodiments, exclusive groups of pixels 50 are disposed in a pixel cluster 40 of pixels 50 that can all be controlled by a common cluster controller 60, e.g., providing active-matrix or passive-matrix pixel control to pixels 50 in pixel cluster 40. Rows of cluster controllers 60 can be connected in common to row wires 17 and columns of cluster controllers 60 can be connected in common to a column wire 19. A row controller 46R can provide row-control signals to cluster controller 60 on row wires 17 and a column controller 46C can provide column-data signals to cluster controller 60 on display column wires 19. Cluster controllers 60 can generate pixel control signals (either active-matrix or passive-matrix) to individual pixels 50 in pixel cluster 40.

Pixel clusters 40 can be arranged in a regular array over substrate 70 or pixel clusters 40 can be arranged in an irregular arrangement over substrate 70. In some embodiments, cluster controllers 60 can be arranged in a regular array on or substrate 70. In some embodiments, cluster controllers 60 are not arranged in a regular array on or over substrate 70. In some embodiments, pixels 50 in a pixel cluster 40 can be arranged in a regular array over substrate 70. In some embodiments, pixels 50 in a pixel cluster 40 can be irregularly arranged over substrate 70.

Row wires 17 and column wires 19 can be connected to an external controller (not separately shown as an individual element in the Figures but, for example, comprising a row controller 46R and a column controller 46C) that provides control signals to each cluster controller 60, for example providing row-select signals and column-data signals, respectively. The signals received by each cluster controller 60 can be used to control pixels 50 in pixel cluster 40.

Each pixel 50 in a pixel cluster 40 can be connected in a row by a cluster row wire 24R to cluster controller 26 and each pixel 50 can be connected in a column by a cluster column wire 24C to cluster controller 60. Cluster controller 60 can comprise a cluster row controller for providing row-select signals to pixels 50 on cluster row wires 24R and a cluster column controller for providing column-data signals to pixels 50 on cluster column wires 24C (not shown in the figures). Cluster controller 60 in pixel cluster 40 can receive row-select signals and column-data signals on row wires 17 and display column wires 19, respectively, from a display controller (not separately shown in the Figures), for example comprising a row controller 46R and a column controller 46C. In a pixel cluster 40 (or in all of pixel clusters 40), pixels 50 can be functionally substantially similar or the same, can operate substantially similarly or the same, and can provide substantially a similar or same function. Adjacent pixels 50 in a common pixel cluster 40 can be spatially separated by a distance D1 different from a distance D2 between adjacent pixels 50 in different adjacent clusters 40 in one dimension (horizontal direction H) and can be spatially separated by a distance D3 in a pixel cluster 40 different from a distance D4 between adjacent pixels 50 in different adjacent pixel clusters 40 in a second, orthogonal direction (vertical direction V).

Substrate 70 can be any useful substrate, for example as found in the integrated circuit or display industries, for example silicon, glass, plastic, or quartz. A display controller or camera controller can be disposed on substrate 70 or off substrate 70, and can comprise one or more integrated circuits, for example a row-controller 46R integrated circuit connected to row wires 17 and a column-data controller 46C integrated circuit connected to display column wires 19. In some embodiments, substrate 70 is a semiconductor substrate, for example silicon, and cluster controllers 60 (individual pixel controllers) are native to (e.g., formed in or on) substrate 70. In some embodiments, substrate 70 is not a semiconductor substrate but is a dielectric substrate, for example glass or plastic, and cluster controllers 60 are formed in a thin-film layer on substrate 70, for example with thin-film transistors. In some embodiments, substrate 70 is not a semiconductor substrate but is a dielectric substrate, for example glass or plastic, and cluster controllers 60 are integrated circuits having a substrate separate and independent of substrate 70 non-native to and disposed on substrate 70, for example one or more silicon CMOS integrated circuits disposed on substrate 70 by micro-transfer printing.

Camera pixels 24 can comprise one or more light-absorbers (e.g., can capture or record light 30 incident on camera pixel 24), such as a photodiode. Each camera pixel 24 can be individually controlled to absorb, capture, or record light 30 corresponding to a pixel value in an image during an image frame period. Row and column wires 17, 19 and cluster row and cluster column wires 24R, 24C can be formed on camera substrate 22 (or an intermediate pixel substrate or cluster substrate) using photolithographic or inkjet methods and materials. In some embodiments, the light-absorbers can be disposed on camera substrate 22 by micro-transfer printing. In some embodiments, the light-absorbers can be disposed by micro-transfer printing light-absorbers onto an intermediate pixel substrate or cluster substrate separate and independent from and disposed on camera substrate 22. Similarly, camera cluster controller 26, if present, can be disposed on camera substrate 22 by micro-transfer printing or can be disposed by micro-transfer printing onto an intermediate pixel or cluster substrate disposed on camera substrate 22.

Display pixels 14 can comprise one or more light-controllers, such as inorganic micro-light-emitting diodes comprising a compound semiconductor material that each emit an amount of light 30 that can be, but is not necessarily, different from the amount of light 30 emitted by any other display pixel 14. Each display pixel 14 can be individually controlled to emit light 30 corresponding to a pixel value in an image during an image frame period. Row and column wires 17, 19 and cluster row and cluster column wires 24R, 24C can be formed on display substrate 12 (or an intermediate pixel substrate or cluster substrate) using photolithographic or inkjet methods and materials. In some embodiments, the light-controllers can be disposed on display substrate 12 by micro-transfer printing. In some embodiments, the light-controllers can be disposed by micro-transfer printing light-controllers onto an intermediate pixel substrate or cluster substrate separate and independent from and disposed on display substrate 12. Similarly, display cluster controller 16, if present, can be disposed on display substrate 12 by micro-transfer printing or can be disposed by micro-transfer printing onto an intermediate pixel or cluster substrate disposed on display substrate 12.

Figure 10B:
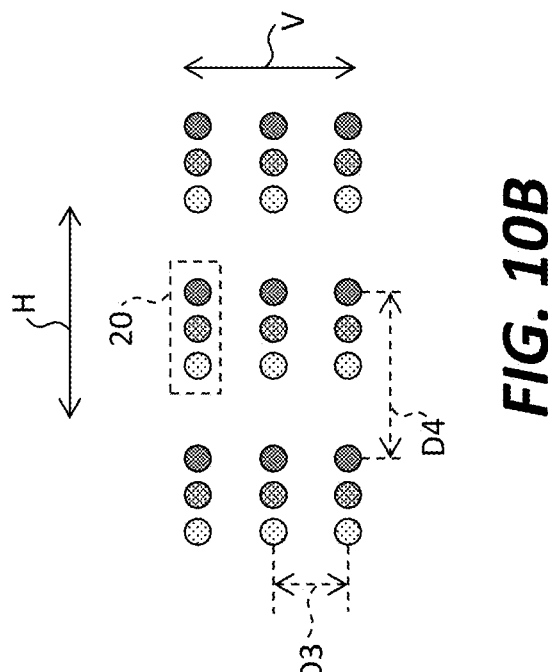
FIG. 10B is a schematic diagram of color pixels with spatial separations of like-colored subpixels in the horizontal direction and in the vertical direction according to illustrative embodiments of the present disclosure.
Figure 10A:
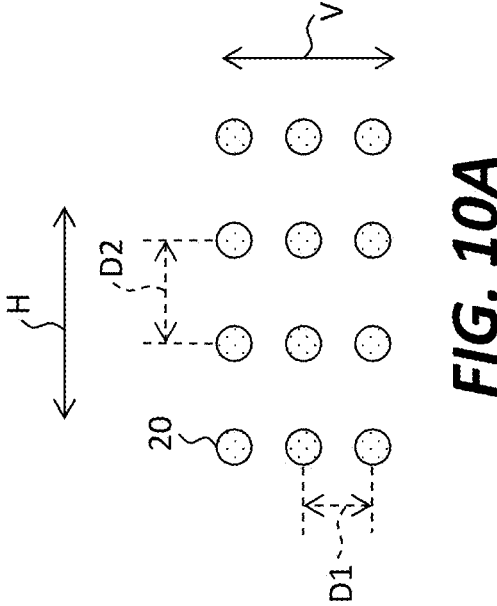
FIG. 10A is a schematic diagram of monochrome pixels with spatial separations in the horizontal direction and in the vertical direction according to illustrative embodiments of the present disclosure.

As shown in FIG. 10A, camera pixels 24 can comprise monochrome camera pixels 24 that absorb a single color of light 30 (or white light 30) or comprise color camera pixels 24 that absorb multiple, different colors of light 30. In embodiments, monochrome camera pixels 24 can comprise a single light absorber, for example a single photodiode that absorbs a single color or white light. As shown in FIG. 10B, in some embodiments, camera pixels 24 are color camera pixels 24 that can comprise multiple subpixel photodiodes, for example multiple photodiodes that can each be individually controlled or responded to and that can each absorb a different color of light 30 and provide a different communication channel, for example a red subpixel that can absorb red light, a green subpixel that can absorb green light, and a blue subpixel that can absorb blue light.

Display pixels 14 can comprise monochrome display pixels 14 that emit a single color of light 30 or comprise color display pixels 14 that emit multiple, different colors of light 30. In embodiments, monochrome display pixels 14 can comprise a single light controller, for example a single light-emitting diode that emits a single color. In some embodiments, display pixels 14 are color display pixels 14 that can comprise multiple subpixel light controllers, for example multiple light-emitting diodes that can each be individually controlled and that can each emit a different color of light 30 and provide a different communication channel, for example a red subpixel that can emit red light, a green subpixel that can emit green light, and a blue subpixel that can emit blue light.

Generally and as shown in FIG. 10A, a spatial separation distance D1 or D2 between adjacent pixels 50 in a direction (e.g., a horizontal or vertical direction H, V) can be the distance between light controllers or absorbers in adjacent pixels 50 that emit or absorb the same color of light 30 or can be the pitch of adjacent pixels 50 that emit or absorb the same color of light 30 in the direction, where the pitch is the distance between centers of the light controller or absorber (e.g., centers of a light-emitting diode or photodiode) in the direction. As shown in FIG. 10B, a spatial separation between adjacent color pixels 50 is defined by the spatial separation between subpixels in adjacent pixels 50 that each emit or absorb the same color of light 30 (e.g., either a pitch of or distance between subpixels that emit or absorb a same color of light 30 in adjacent pixels 50 as illustrated with different shading in FIG. 10B) in vertical direction V and distance D4 in orthogonal horizontal direction H. Color subpixels in a pixel 50 can be arranged in a variety of ways, for example in a line or in a triangular arrangement (where there are three subpixels in pixel 50) or other arrangements.

FIGS. 3, 4, and 6 illustrate embodiments of the present disclosure in which a camera cluster controller 26 can occupy significant area over camera substrate 22 so that camera pixel 24 resolution around camera cluster controller 26 is less than camera pixel 24 resolution in camera substrate 22 areas remote or away from camera cluster controllers 26. Thus, in some embodiments, variable-resolution camera 20 has fewer camera pixels 24 per unit area of camera substrate 22 closer to a center C of camera substrate 22 or of variable-resolution camera 20 than to an edge E of camera substrate 22 or of variable-resolution camera 20. In some embodiments, camera pixels 24 in pixel clusters 40 have fewer camera pixels 24 per unit area of camera substrate 22 than camera pixels 24 between pixel clusters 40 of camera pixels 24.

In some embodiments, camera pixels 24 in pixel clusters 40 have more camera pixels 24 per unit area of camera substrate 22 than camera pixels 24 between pixel clusters 40 of camera pixels 24. In some embodiments, camera pixels 24 in pixel clusters 40 or closer to a center C of camera substrate 22 have more camera pixels 24 per unit area of camera substrate 22 than camera pixels 24 near an edge E of camera substrate 22. In embodiments, camera substrate 22 has edges E (e.g., two or more edges E or has a rectangular shape with four edges E) and fewer camera pixels 24 per unit area of camera substrate 22 are disposed at one of edges E than at another of edges E or closer to a center of camera substrate 22 or variable-resolution camera 20.

As shown in FIG. 7 and according to some embodiments of the present disclosure, camera wires 28 (or buses or connectors comprising camera wires 28) can require significant area on camera substrate 22. In order to provide space for camera wires 28, separation distance D1 between adjacent camera pixels 24 can be larger where camera wires 28 are more densely provided than separation distance D2 between adjacent camera pixels 24 where camera wires 28 are less densely provided. As shown in FIG. 7, the separation distance between adjacent camera pixels 24 in horizontal direction H is constant (not variable) and the separation distance between adjacent camera pixels 24 in vertical direction V is variable (not constant), as shown with different separation distances D1 and D2 between adjacent camera pixels 24 in vertical direction V.

FIG. 7 illustrates embodiments with a single connector or bus of camera wires 28 regularly distributed over a single contiguous portion of an edge E of camera substrate 22. Such embodiments can, for example, be useful to reduce display bezel size on one or more sides of a variable-resolution camera 20, for example locating all of the camera wire 28 connections on one side of camera substrate 22. Camera wires 28 can be cluster row wires 24R and cluster column wires 24C or row wires 17 and column wires 19. FIG. 7 also illustrates color camera pixels 24 having color subpixels (different photodiodes 25 or photodiodes 25 with different color filters, as indicated with different shading in FIG. 7). Each subpixel can be connected with separate camera wires 28, taking even more space on display substrate 12. In the Figures, the separation distances and sizes of camera cluster controllers 26 and camera wires 28 are exaggerated for clarity of illustration and understanding.

In embodiments of the present disclosure, variation in camera pixel 24 spatial density on camera substrate 22 can result from spacing requirements for both circuits (e.g., camera cluster controllers 26) and camera wires 28. In general, camera pixel 24 variable spatial density over camera substrate 22 can (but does not necessarily) depend on either or both circuits (e.g., camera cluster controllers 26) and camera wires 28, or indeed any other structure disposed over camera substrate 22 in any direction. In conventional embodiments, where such structures are present on camera substrate 22, camera pixels 24 are spaced farther apart in a regular arrangement, reducing resolution. Instead, and according to embodiments of variable-resolution camera 20, where camera pixels 24 can be disposed more closely together they are disposed more closely together, where they cannot be disposed more closely together, they are not disposed more closely together, resulting in a greater number of camera pixels 24 on camera substrate 22 disposed with a variable spacing than if regular spacing was used. To improve resolution, in conventional camera structures camera wires 28 or circuits can be disposed in additional layers in or on the camera substrate 22, but this increases manufacturing costs. Thus, in embodiments of the present disclosure, variable-resolution camera 20 can provide a greater number of camera pixels 24 for communicating increased quantities of information in a given time with a lower manufacturing cost. For example, a camera pixel 24 pitch can be twenty or forty microns where camera cluster controllers 26 can have a dimension of forty or eighty microns, so that a pitch of camera pixels adjacent to camera cluster controller 26 can be twice that of a pitch of camera pixels 24 non-adjacent to camera cluster controller 26 in a dimension or direction. Thus, camera pixels 24 adjacent to camera cluster controller 26 can have a pitch that is two, three, or four times a pitch of camera pixels 24 non-adjacent to camera cluster controller 26 in a direction. The pitch difference need not be an integral multiple but can, for example have a difference of 1.5, 2.5 or any other multiple. The pitch ratio (or pitch between camera pixels 24) can be different in different dimensions, e.g., because camera pixels 24 need not be square and camera cluster controller 26 need not be square. For example, as shown in the variable-resolution camera 20 of FIG. 1, the pitch ratio is two in both horizontal and vertical dimensions and FIG. 5B shows a pitch ratio of three in both horizontal and vertical dimensions. FIG. 7 illustrates pitch ratios that are different in different directions.

Moreover, conventional cameras can have a fixed pixel spatial resolution adapted to the human visual system and limited by control circuits (e.g., thin-film transistors) that control camera pixels 24 and camera wiring 28 that can require significant area and are not readily routed over camera substrate 22. For example, a camera cluster controller 26 can occupy so much area over camera substrate 22 that it inhibits the close disposition of camera pixels 24 in that area. In contrast, embodiments of the present disclosure provide increased data communication rates by providing more camera pixels 24 in variable-resolution camera 20 that are used to communicate data with images rather than pictures. In such embodiments, the captured camera images are not necessarily viewed by a human observer and the constraints on cameras designed for human observers (e.g., due to the human visual system) need not necessarily apply. In particular, humans generally prefer viewing captured images 34 from a camera with a fixed and consistent spatial resolution over its extent (e.g., over the area of a camera substrate 22). In contrast to such a conventional camera, according to embodiments of the present disclosure, a variable-resolution camera 20 used for data communications (e.g., in a telecommunication or data center application) can communicate more data with more camera pixels 24 providing a greater bandwidth. Therefore, portions of camera substrate 22 that are not used for control circuits (e.g., camera cluster controllers 26) or camera wiring 28 can be used for additional camera pixels 24 at a greater spatial density, thereby increasing the pixel spatial resolution in such areas. Stated inversely, areas of camera substrate 22 used for circuits or camera wiring 28 can have fewer camera pixels 24 per area and reduced spatial resolution than other areas. (As used herein, a reduced, smaller, or lower pixel spatial resolution has fewer camera pixels 24 per area of camera substrate 22 and an increased, greater, or higher pixel spatial resolution has more camera pixels 24 per area of camera substrate 22.)

Each camera pixel 24 can include one or more light-absorbers (e.g., subpixels) such as micro-light-capturing photodiodes 25 that can be disposed on camera substrate 22 by micro-transfer printing and can, in consequence, comprise a broken (e.g., fractured) or separated tether 80, as shown in FIG. 5B. Similarly, any camera cluster controller 26 (or other circuits) can be disposed on camera substrate 22 by micro-transfer printing and can, in consequence, comprise a broken (e.g., fractured) or separated tether 80, as shown in FIG. 6.

According to embodiments of the present disclosure, a variable-resolution optical communication system (e.g., a free-space variable-resolution optical communication system) 90 for transmitting optical data can comprise display 10 (e.g., variable-resolution display 10) and a digital camera system comprising a digital variable-resolution camera 20 disposed relative to, and in optical communication with, variable-resolution display 10 and a processor 62 (that can be integrated into or be a part of digital variable-resolution camera 20), as shown in FIG. 1, to communicate data, e.g., binary data, from input images 32 displayed on variable-resolution display 10 to digital variable-resolution camera 20. Digital variable-resolution camera 20 can be operable to capture and record input image 32 displayed on variable-resolution display 10 and processor 62 connected to or a part of digital variable-resolution camera 20 can be operable to process the recorded image, forming processed captured image 34, to extract communicated data from the recorded image. The recorded image or processed captured image 34 (or both) can be stored in a memory 64 connected to processor 62 and disposed either internally or externally to digital variable-resolution camera 20.

In some embodiments, digital variable-resolution camera 20, memory 64, or processor 62 can store or contain a digital map of display pixels 14 on display substrate 12 and camera pixel 24 locations on camera substrate 22 to facilitate the recorded image processing (e.g., using pattern matching, convolutions or other algorithmic or mathematical methods to compare the digital map(s) to the recorded image and locate camera pixels 24 in the recorded image) by processor 62 and identify camera pixels 24 in the recorded image to extract a value from each of the located camera pixels 24 in the processed captured image 34.

The data rate for variable-resolution optical communication system 90 is limited by the number of camera pixels 24 and the data rate at which images can be displayed on and the number of display pixels 14. Therefore, by providing an increased number of camera pixels 24 with a variable resolution over camera substrate 22, data can be communicated at a higher data rate, despite the presence of any camera cluster controllers 26 or other circuits, and camera wires 28 disposed on camera substrate 22 of variable-resolution camera 20.

Variable-resolution display 10 can be a multi-pixel display that optically emits light 30 from display pixels 14. Display pixels 14 can be disposed in any useful variable-resolution arrangement and can be captured by digital variable-resolution camera 20. Each input image 32 displayed on variable-resolution display 10 is an image frame (e.g., frame) and the number of different received input images 32 that can be displayed per unit of time by variable-resolution display 10 is the display frame rate. Variable-resolution display 10 can operate at higher frame rates with light emitters that can switch on and off faster, for example light-emitting diodes, and displayed images can be more readily detected by digital variable-resolution camera 20 with light emitters that are relatively bright, such as inorganic light emitters. In some embodiments, display pixels 14 of variable-resolution display 10 comprise inorganic light-emitting diodes (iLEDs). Similarly, variable-resolution camera 20 can be a multi-pixel camera that optically absorbs light 30 from display pixels 14 with camera pixels 24. Camera pixels 24 can be disposed in any useful variable-resolution arrangement. In some embodiments, camera pixels 24 are arranged in a configuration that matches the arrangement of display pixels 14. Each image 34 captured by variable-resolution camera 20 can be an image frame (e.g., frame) and the number of different captured images 34 that can be captured per unit of time by variable-resolution camera 20 is the camera frame rate. The camera frame rate and the display frame rate can match or be different. In some embodiments the camera frame rate is no slower than the display frame rate. In some embodiments, the camera frame rate is faster than the display frame rate, for example an integer multiple times faster, such as twice or four times as fast.

Digital variable-resolution camera 20 is any camera capable of digitally capturing and recording an image with an array of camera pixels 24, each camera pixel 24 operable to record a portion of an image exposed onto the array of camera pixels 24, e.g., with an optical system 36 comprising one or more lenses. Digital variable-resolution camera 20 can have more camera pixels 24 than variable-resolution display 10 has display pixels 14 so that digital variable-resolution camera 20 can record each of display pixels 14 with at least one and optionally multiple camera pixels 24. Digital variable-resolution camera 20 can be a black-and-white camera, can be responsive to only a single color of light 30, or can be a color digital variable-resolution camera 20 responsive to different colors of light 30 to record a color image. In some embodiments, camera pixels 24 each comprise a single light detector (such as a CCD or CMOS photodetector, photodiode, phototransistor, or other light sensor) responsive to light 30 or a color of light 30. In some embodiments, camera pixels 24 each comprise multiple light detectors (such as CCD or CMOS photodetectors, photodiode, phototransistor, or other light sensors) each responsive to a different color (frequency) of light 30 (for example are exposed to light 30 through different color filters). In some embodiments, digital variable-resolution camera 20 detects only white light 30, only green light 30, only infrared light 30, only blue light 30, or only ultraviolet light 30 emitted from camera pixels 24 of variable-resolution camera 20.

In some embodiments, digital variable-resolution camera 20 has an image capture (recording) frame rate equal to or greater than a display frame rate of variable-resolution display 10 (e.g., a camera frame rate equal to or faster than a display frame rate at which variable-resolution display 10 receives and displays input images 32, e.g., one and a half or twice as fast). Digital variable-resolution camera 20 can be implemented with a state machine or computing circuits in digital variable-resolution camera 20 to capture and analyze the captured image 34, e.g., using image processing to form a processed captured image 34.

Variable-resolution optical communication system 90 can comprise a variable-resolution display 10 and digital variable-resolution camera 20 system, for example each disposed on a printed circuit board and comprising digital integrated circuits, light-emitting diodes, light sensors, and optical components such as lenses for directing light 30.

In embodiments of the present disclosure, images can be binary images with display pixels 14 of variable-resolution display 10 that are either on or off. Such embodiments can be efficient if display pixels 14 comprise iLEDs operated at a single desired current density. Similarly, digital variable-resolution camera 20 can be a black-and-white camera that provides a binary output in response to light 30 exposure. In embodiments, digital variable-resolution camera 20 is a binary camera that captures and records binary optical signals. Thus, in some embodiments, variable-resolution optical communication system 90 is a binary variable-resolution optical communication system 90. In some embodiments, each display pixel 14 and camera pixel 24 can emit or respond to multiple different values, e.g., an eight-bit value, corresponding to a luminance of the pixel. In such embodiments, more information can be transmitted in each signal but with reduced signal-to-noise ratio.

In conventional displays and/or cameras, it is normally desirable to have uniform resolution, for example to avoid the appearance of distortions to a viewer. Because embodiments of the present disclosure are directed to optical communication systems, variation in resolution does not have such detrimental effect on performance. Spatial variation in resolution does not necessarily have an adverse impact on data transfer (e.g., rate and/or accuracy).

Having described certain implementations of embodiments, it will now become apparent to one of skill in the art that other implementations incorporating the concepts of the disclosure may be used. Therefore, the disclosure should not be limited to certain implementations, but rather should be limited only by the spirit and scope of the following claims.

Throughout the description, where apparatus and systems are described as having, including, or comprising specific elements, or where processes and methods are described as having, including, or comprising specific steps, it is contemplated that, additionally, there are apparatus and systems of the disclosed technology that consist essentially of, or consist of, the recited elements, and that there are processes and methods according to the disclosed technology that consist essentially of, or consist of, the recited processing steps.

It should be understood that the order of steps or order for performing certain action is immaterial so long as operability is maintained. Moreover, two or more steps or actions in some circumstances can be conducted simultaneously. The disclosure has been described in detail with particular reference to certain embodiments thereof, but it will be understood that variations and modifications can be effected within the spirit and scope of the disclosure.

PARTS LIST

C center/substrate center/pixel cluster center
D1 first distance
D2 second distance
D3 third distance
D4 fourth distance
D5 fifth distance
E edge/substrate edge/pixel cluster edge
H horizontal direction
V vertical direction
10 display/variable-resolution display
12 display substrate
14 display pixel
16 display cluster controller
17 row wire
18 display wire
19 column wire
20 variable-resolution camera/camera
22 camera substrate
24 camera pixel
24C cluster column wire
24R cluster row wire
25 photodiode
26 camera cluster controller
27 pixel controller
28 camera wire/wire
30 light
32 display image/input image
34 camera image/captured image
36 optical system/optic(s)/lens
40 pixel cluster/cluster
46C camera column controller/column controller
46R camera row controller/row controller
50 pixel
60 cluster controller
62 processor
64 memory
70 substrate
80 tether
90 variable-resolution optical communication system
100 provide optical communication system step
110 receive image step
120 display image step
122 display image row step
130 camera capture image row step 132 camera capture image step
140 process captured image step
150 output information step
152 output information row step

What is claimed:

1. A variable-resolution optical communication system comprising:
   a display operable to display an image; and
   a variable-resolution camera disposed and operable to optically capture the image displayed on the display;
   wherein the display comprises a display substrate, display pixels disposed on the display substrate, and a display pixel cluster comprising a display cluster controller disposed on the display substrate between display pixels, wherein the display cluster controller is operable to control two or more display pixels; and
   wherein the variable-resolution camera comprises a camera substrate, camera pixels disposed on the camera substrate, and a camera pixel cluster comprising a camera cluster controller disposed on the camera substrate between camera pixels, wherein the camera cluster controller is operable to control two or more camera pixels.

2. The variable-resolution optical communication system of claim 1:
   wherein the display pixels have a variable spatial resolution over the display substrate and are controllable to emit light; and
   wherein the camera pixels have a variable spatial resolution over the camara substrate and are controllable to capture light.

3. The variable-resolution optical communication system of claim 2, wherein the variable spatial resolution of the display pixels is spatially matched to the variable spatial resolution of the camera pixels.

4. The variable-resolution optical communication system of claim 2, wherein the variable spatial resolution of the display pixels is geometrically similar to the variable spatial resolution of the camera pixels.

5. The variable-resolution optical communication system of claim 3, wherein the display is disposed relative to the variable-resolution camera such that at least one of the display pixels is optically imaged to at least one of the camera pixels.

6. The variable-resolution optical communication system of claim 3, wherein the display is disposed relative to the variable-resolution camera such that at least one of the display pixels is optically imaged to at least one group of multiple, adjacent camera pixels.

7. The variable-resolution optical communication system of claim 6, wherein the multiple, adjacent camera pixels form a two-dimensional array.

8. The variable-resolution optical communication system of claim 1, wherein the display is disposed relative to the variable-resolution camera such that the display pixel cluster is optically imaged onto the camera pixel cluster.

9. The variable-resolution optical communication system of claim 1, wherein the display pixel cluster is geometrically similar to the camera pixel cluster.

10. The variable-resolution optical communication system of claim 1, wherein the display is a variable-resolution display.

11. A method of operating the variable-resolution optical communication system of claim 1, comprising:
   displaying an image using the display pixels of the display;

recording the image with the camera using the camera pixels of the variable-resolution camera; and extracting information from the recorded image.

12. The method of claim 11, comprising recording all of the camera pixels at a first time or during a first time period before recording one or more of the camera pixels at a second time after the first time or during a second time period after the first time period.

13. The method of claim 11, comprising recording all of the camera pixels at a same time.

14. The method of claim 11, comprising (i) sequentially capturing or recording rows of the camera pixels or sequentially recording columns of the camera pixels, (ii) sequentially capturing or recording rows of the camera pixels or sequentially capturing or recording columns of the camera pixels, or (iii) both (i) and (ii).

* * * * *